United States Patent
Saito

[19]

[11] Patent Number: 5,818,458
[45] Date of Patent: Oct. 6, 1998

[54] GRAPHIC-SHAPING METHOD AND APPARATUS FOR PRODUCING AXISSYMMETRICAL GRAPHIC WITH RESPECT TO VALID SYMMETRY AXES

[75] Inventor: Shigeru Saito, Tokyo, Japan

[73] Assignee: NEC Corporation, Tokyo, Japan

[21] Appl. No.: 745,183

[22] Filed: Nov. 7, 1996

[30] Foreign Application Priority Data

Nov. 7, 1995 [JP] Japan .................................. 7-311659

[51] Int. Cl.$^6$ ............................................ G06T 3/00
[52] U.S. Cl. ............................................ 345/441
[58] Field of Search .................... 395/140, 141, 395/133–139; 345/441

[56] References Cited

U.S. PATENT DOCUMENTS 5,555,357  9/1996  Fernandes et al. ..................... 395/140

FOREIGN PATENT DOCUMENTS 62-111369  5/1987  Japan .
63-261481  10/1988  Japan .

Primary Examiner—Almis R. Jankus
Attorney, Agent, or Firm—Whitham, Curtis & Whitham

[57] ABSTRACT

A method and apparatus for determining symmetry of a graphic includes determining a feature of an inputted graphic, the feature including coordinates of vertexes of the graphic, the vertexes including ends of graphic lines of the graphic. Thereafter, symmetry axes are formed through the graphic, and a symmetry axis is selected from the symmetry axes. Line segments are formed between pairs of opposing vertexes of the vertexes, and the distances are measured between midpoints of the line segments and a point where the line segment crosses the selected symmetry axis. Angles are determined between the selected symmetry axis and the line segments, and it is determined whether the selected symmetry axes is a valid symmetry axis. The number of the valid symmetry axes are counted, and inter-axial angles between adjacent valid symmetry axes are measured when the number of valid axes is greater than two. Thereafter, it is determined whether the graphic is a symmetric graphic by determining whether the inter-axial angles are within a predetermined range of angles. When the graphic is not a symmetric graphic, the feature of the graphic is modified such that the inter-axial angles become within the predetermined range.

26 Claims, 23 Drawing Sheets

GRAPHIC-SHAPING METHOD AND APPARATUS FOR PRODUCING AXISSYMMETRICAL GRAPHIC WITH RESPECT TO VALID SYMMETRY AXES

BACKGROUND OF HE INVENTION

1. Field of the Invention

The present invention generally relates to a graphic-shaping method and apparatus which evaluate graphics inputted with word processors, CAD (computer-aided design) systems or the like, for symmetry of shape.

2. Description of the Related Art

Conventional graphic-shaping apparatuses are described in, for example, Japanese Unexamined Patent Application 62-111369 (hereinafter "Japanese '369") and Japanese Unexamined Patent Application 63-261481 (hereinafter "Japanese '481").

The graphic-shaping apparatus described in Japanese '369 is illustrated in FIG. 18 of the present application, and is for automatically reading design drawings and for recognizing graphic symbols. The apparatus of Japanese '369 includes a recognizing-process section 3 having a symmetry-judging means 1 and a comparator circuit 2, a symbol table 4 which contains definitions of groups of symmetric and asymmetric symbols, and a symmetrizing-conversion section 5.

The operation of the apparatus of Japanese '369 is illustrated in FIG. 19 of the present application. In steps a1 and a2, an image to be recognized is input to the recognizing-process section 3, and a first result 1A of recognition is outputted from the recognizing-process section 3.

In step a3, the image is compared with the symbols defined in the symbol table 4. If the image is not defined (e.g., a "NO" in step a3) in the symbol table 4, the process proceeds to step a10 and the first result 1A is outputted. Conversely, when the image is defined in the symbol table 4, the process proceeds to step a4.

In step a4, the image is subjected to a symmetrizing conversion operation in the symmetrizing-conversion section 5. In the symmetrizing conversion of Japanese '369, one side of the image is superimposed on the other.

In steps a5 and a6, the image acquired by the symmetrizing conversion in the symmetrizing-conversion section 5 is subjected again to the recognizing processing in the recognizing-process section 3 to produce a second result 2A.

In steps a7–a9, the first result 1A and the second result 2A are compared by the comparator circuit 2. When the two results are identical (e.g., a "YES" in step a7), the first result 1A is output in step a8. Otherwise (e.g., a "NO" in step a7), the image is rejected in step a9 because it was not recognized.

A second conventional graphic-shaping apparatus as described in Japanese '481 is designed to recognize drawings depicted in simplified notation, and to provide dimensions based on the content of the recognized drawing, and is illustrated in FIG. 20 of the present application. The apparatus in Japanese '481, as shown in FIG. 20, includes a graphic-recognizing unit 6, a candidate symmetry-segment extraction means 7, a vertical-segment setting means 8, calculating means 9 and information-on-drawing setting means 10.

The graphic-recognizing unit 6 of Japanese '481 includes a reading-process section 11, an image-data storage section 12, a vectoring-process section 13 for converting image data into vector data by "broken-line approximation", a vector classifying-process section 14 for sorting the vector data into vector data based on symbols, characters and segments, a symbol recognizing-process section 15 for recognizing symbols and determining attributes based on the symbols, a segment distinguishing-process section 16 for sorting the segments data into outlines, center lines, etc., a character recognizing-process section 17 for recognizing the characters and determining the attributes and a recognition-result storage section 18 which stores the results of recognition.

Below, the processing of images with the apparatus of Japanese '481 is described. First, a drawing is read (e.g., scanned) through the reading-process section 11 and input to the image-data storage section 12. The image data is converted into vector data by "broken-line approximation" through the vector-processing section 13, and then output to the vector sorting-process section 14. For purposes of this application, "broken line approximation" refers to a normalization process. The vector data is sorted into vectors of symbols, characters and segments by the vector sorting-process section 14, and then is output to the symbol recognizing-process section 15, the segment distinguishing-process section 16 and character recognizing-process section 17, respectively.

The segment distinguishing-process section 16 classifies the segments data into outlines, center lines, etc. based on a predetermined classification scheme. Characters and symbols are respectively distinguished through the character recognizing-process section 17 and the symbol recognizing-process section 15, and are stored in the recognition-result storage section 18.

Below, the processing operations of the candidate symmetry-segment extraction means 7, vertical-segment setting means 8, calculating means 9 and information-on-drawing setting means 10 of Japanese '481 are described with reference to FIG. 21 of the present application.

First, in step b1, data is loaded from the recognition-result storage section 18. In step b2, the candidate symmetry-segment extraction means 7 extracts center lines which are capable of being symmetry axes from the loaded data, and counts the number of center lines which may be symmetric. In step b3, each of the extracted center lines is checked to see whether an outline crosses the center line or whether an isolated outline is present above, below, to the right or to the left of the center line.

In step b4, it is determined whether either isolated configurations or pairs of non-isolated configurations are present. For purposes of the present application, an "isolated configuration" is a shape or graphic which does not contact the axis of symmetry, whereas a "non-isolated configuration" is a shape or graphic through which the axis of symmetry passes. The process proceeds to step b5 when non-isolated configurations or pairs of isolated configurations are present (e.g., a "YES" in step b4), whereas the process returns to step b3 when no non-isolated configurations or pairs of isolated configurations are present (e.g., a "NO" in step b4).

Step b5 determines whether the outline crosses the center line (e.g., is symmetrical) or the isolated configuration is symmetrical by use of the vertical-segment setting means 8 and the calculating means 9.

Step b6 again checks whether the configurations found in step b5 are divided symmetrically by the center line. The process proceeds to step b7 when the configurations are symmetrical, whereas the process returns to step b3 when the configurations are not symmetrical.

In step b7, the information-on-drawing setting means 10 sets information on the drawing which has been omitted which relates to the symmetrical outlines. Thus, information on the drawing is set for the symmetric outline for which the information has not been set, based on the known information. In step b8, it is determined whether all information has been checked. When all data has been checked, step b8 outputs an end signal to the candidate symmetry-segment extraction means 7. If there remain further data for checking, then the process returns to step b3.

Below, the conventional method of judging symmetry disclosed in Japanese '481 will be described with reference to FIG. 22. A vector L2 is drawn from an endpoint c2 through and perpendicular to an arbitrary vertical center line d. The center line d is manually drawn by the user prior to being input into the system. The distance L2' between the endpoint c2 and the center line d is measured by the calculating means 9.

Additionally, the distance L2" from the point $X_2$ along vector e, to the center line d is determined. Thereafter, the difference between the distances L2' and L2" is calculated, and these values are substituted into Equation (1).

$$|L2'-L2''|<\Delta L/2 \tag{1}$$

The same calculation is applied to other endpoints perpendicular to center line d. The outline is determined to be symmetrical around the center line d when Equation (1) is satisfied for all the endpoints, and the total of the differences between the respective distances and the required threshold value Q satisfy Equation (2).

$$\Sigma|Ln'-Ln''|<Q \tag{2}$$

However, the above-described conventional apparatuses have several drawbacks.

First, a drawback of the apparatus of Japanese '369, is that all of the symmetrical graphics must be previously stored in symbol table 4. Specifically, if a graphic is not in symbol table 4, then the graphic will be considered asymmetric regardless of whether it actually is a symmetric graphic.

Additionally, the apparatus described in Japanese '481, requires that the center line be depicted in advance by the user. Therefore, the user must note the axis of the center of the drawings. This is cumbersome and inefficient.

Additionally, neither Japanese '369 nor Japanese '481 have the capability of shaping graphics. These methods can only evaluate whether the graphics are symmetrical.

Moreover, the conventional apparatuses require a large amount of storage space. Indeed, in Japanese '369, it is necessary that the symbol table 4 be made larger in order to define more symmetrical graphics therein. Therefore, in such cases, a large-capacity memory or disk is required.

Additionally, both of the conventional apparatus are unable to deal with a plurality of center lines.

SUMMARY OF THE INVENTION

In view of the foregoing problems of the conventional systems, an object of the present invention is to provide a graphic-shaping method and apparatus which determines whether inputted (e.g., typically "freehand", user-drawn) graphics are symmetrical about an axis regardless of their configurations, and which allows shaping of the graphics based on the result of such a determination.

In a first aspect, a graphic-shaping apparatus according to the present invention includes featuring-quantum calculation means for calculating features of a graphic, including at least coordinates of the vertexes, candidate symmetry-axis calculation means for calculating all the candidate symmetry axes of the graphic based on the features, candidate-symmetry-axis-for-judgement selection means which sequentially selects one candidate symmetry axis from those candidate symmetry axes in a predetermined order, and segment-for-judgement calculation means for calculating segments which evaluates axis symmetry of the graphic for each of the selected candidate symmetric axes.

The present invention further includes distance-to-symmetry-axis calculation means for calculating distances of the midpoints of the segments to the selected symmetry axis, symmetry-axis-forming-angle calculation means for calculating angles between the selected symmetry axis and the segments, symmetry-judging means for judging the validity of each of the selected candidate symmetry axes based on the angles calculated by the symmetry-axis-forming-angle calculation means and the distances measured by the distance-to-symmetry-axis calculation means, and inter-axial-angle calculation means for calculating the number of the candidate symmetry axes which are evaluated to be valid, and for calculating the inter-axial angles between the respective two adjacent candidate symmetry axes when the number of the candidate symmetry axes is at least three.

Further, symmetrizing means are provided for judging whether all the inter-axial angles are within a predetermined range of angles and for modifying the features of the graphic so that the graphic is axisymmetrical (e.g., symmetrical about an axis) when all of the inter-axial angles are within the predetermined range of angles.

In yet another aspect of the invention, a method of shaping a graphic includes steps of calculating features of a graphic, including at least coordinates of the vertexes, calculating all the candidate symmetry axes of the graphic based on the features, sequentially selecting one candidate symmetry axis from those candidate symmetry axes in a predetermined order, calculating segments which evaluates axis symmetry of the graphic for each of the selected candidate symmetric axes, and calculating distances of the midpoints of the segments to the selected symmetry axis.

Further, the method includes calculating angles between the selected symmetry axis and the segments, judging the validity of each of the selected candidate symmetry axes based on the angles calculated and the distances measured, calculating the number of the candidate symmetry axes which are evaluated to be valid, and calculating the inter-axial angles between the respective two adjacent candidate symmetry axes when the number of the candidate symmetry axes is at least three.

Lastly, the inventive method judges whether all the inter-axial angles are within a predetermined range of angles and for modifying the features of the graphic so that the graphic is axisymmetrical when all of the inter-axial angles are within the predetermined range of angles.

With the unique and unobvious method and structure of the invention, all of the symmetrical graphics need not be stored previously in a symbol table or the like. Thus, even if a graphic is not in the symbol table or the like, it may still be judged for symmetry and be shaped accordingly as a result of the symmetry judgment, unlike the conventional methods.

Further, the center line need not be depicted in advance by the user, and therefore the user does not have to note the axis of the center of the drawings. Hence, an efficient and precise graphic-shaping operation results.

Additionally, the invention provides a capability of shaping graphics, since the invention can do more than simply evaluate whether the graphics are symmetrical.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF A PREFERRED EMBODIMENT OF THE INVENTION

Figure 1:
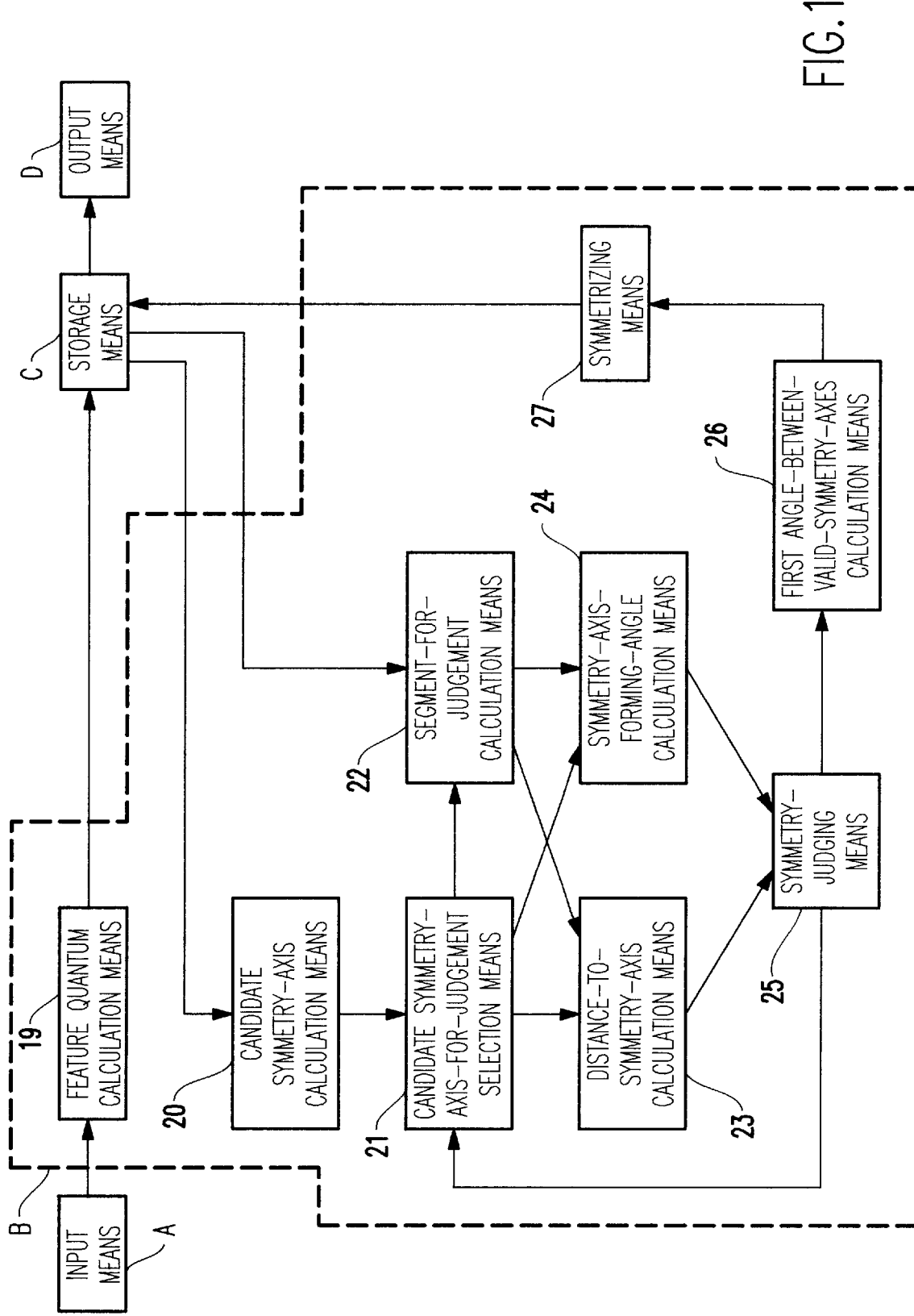
FIG. 1 is a block diagram illustrating a first preferred embodiment of the graphic-shaping apparatus according to the present invention.

Referring now to the drawings, FIGS. 1–6 illustrate a first preferred embodiment of a graphic-shaping apparatus according to the present invention.

The preferred embodiment may be implemented in a hardware environment including a word processor having graphics software, a computer-aided design (CAD) workstation, a pocket computer such as an Apple Newton, or the like. An input device (a keyboard, a mouse, and/or other user interface devices) may be employed either attached to the preferred hardware or integrally built therein.

As shown in FIG. 1, the first preferred embodiment of the apparatus according to the present invention, includes input device A (which corresponds to the input device mentioned above) for inputting a graphic which may include, for example, a keyboard, a mouse, a pen, a "joystick", a trackball, a touch screen, an image scanner or the like. The graphic is typically a compilation of points, lines and curves for forming a graphical image or character.

The apparatus also includes a data-processing unit B (which is coupled to the system bus not shown) for processing the graphics input from the input device A.

A storage device C stores the graphics, various features of the graphics (described below) and information on the graphics from the data-processing unit B, etc. The storage device C preferably is formed by the DASD.

An output device D outputs the information, from the storage device C, relating to the graphics and includes, for example, a cathode ray tube (CRT) monitor, a liquid crystal display (LCD) monitor, plotter or printer.

As shown in FIG. 1, the data-processing unit B includes feature-quantum calculation means 19 for identifying the features of the graphic, such as the coordinates of the vertexes, lengths of the sides and angles between the sides, and shapes such as a pair of parallel sides, a pair of vertical sides, a pair of sides and angles which are the same, etc.

Although the present embodiment is based on the assumption that the graphics have straight lines, the embodiment may also be applied to graphics having curved lines as would be known by one of ordinary skill in the art within the purview of the present application. In such an embodiment, the feature-quantum calculation means 19 would calculate information on whether the sides are straight or curved in addition to the lengths of the sides, etc. The feature-quantum calculation means 19 outputs this feature information to the storage device C.

The data processing unit B also includes a candidate symmetry-axis calculation means 20 for calculating all possible candidate symmetry axes of the graphic based on the feature information output by the featuring-quantum calculation means 19.

The candidate symmetry axes include all the possible axes of symmetry of the graphic. Specifically, pairs of opposing vertexes, pairs of midpoints of sides, and pairs of vertexes and opposing midpoints of sides through which symmetry axes may pass are identified to create a list of candidate symmetry axes. As mentioned, the candidate symmetry axes pass through the pairs of the vertexes, the pairs of midpoints of the sides, or the pairs of the vertexes and midpoints of the sides.

A candidate-symmetry-axis-for-judgement selection means 21 sequentially selects each of the candidate symmetry axis outputted by the candidate symmetry-axis calculation means 20.

The data processing unit B also includes a segment-for-judgement calculation means 22 which produces line segments which cross the selected symmetry axis. The various line segments are drawn between approximately opposite vertexes which are positioned on opposite sides of the selected symmetry axis so that the line segments cross the selected symmetry axis.

For example, the segment-for-judgment calculation means 22 would begin at a first end of the selected symmetry axis and would determine which vertex was adjacent the first end. Then, the segment-for-judgment calculation means 22 finds another vertex which is adjacent the first end of the selected symmetry axis, but which is positioned on the other side of the selected symmetry axis. Thus, the segment-for-judgment calculation means 22 will locate two vertexes which are adjacent the first end of the selected symmetry axis and which are positioned on opposite sides of the selected symmetry axis.

Then, the segment-for-judgment calculation means 22 forms a line segment between these two vertexes that crosses the selected symmetry axis. The line segment is substantially perpendicular to the selected symmetry axis.

After the first line segment is formed, the segment-for-judgment calculation means 22 locates the next most adjacent opposing pair of vertexes and forms a second line segment which also crosses the selected symmetry axis. The second line segment will cross the selected symmetry axis at a distance further from the first end of the selected symmetry axis than where the first line segment crosses the selected symmetry axis.

The above process is repeated moving in a direction away from the first end of the selected symmetry axis toward the other end of the selected symmetry axis, so that the line segments are formed in "n" steps (where n is a positive integer).

The data processing unit B also includes a distance-to-symmetry-axis calculation means 23 which calculates the midpoints of the various line segments drawn by the segment-for-judgement means 22. Then, the distance-to-symmetry-axis calculation means calculates the distance between the midpoints of the line segments and the point where the selected symmetry axis crosses the line segment.

A symmetry-axis-forming-angle calculation means 24 calculates angles by which the various line segments, formed by the segment-for-judgment calculation means 22, deviate from being perpendicular to the selected symmetry axis. The angle is the difference between the line segment and the normal (i.e., 90°) of the selected symmetry axis.

Symmetry-judging means 25 determines the symmetry of the graphic based on the number "n" of line segments calculated by the segment-for-judgment calculating means 22, the distances measured by the distance-to-symmetry-axis calculation means 23 and the angles calculated by the symmetry-axis-forming-angle calculation means 24. The symmetry-judging means 25 determines whether each of the candidate symmetry axes divide the graphic into symmetric halves and whether the candidate symmetry axis is a valid candidate symmetry axis.

The data processing unit B also includes first angle-between-valid-symmetric-axes calculation means 26 which, based on an input from the symmetry-judging means 25, calculates the number of candidate symmetry axes that are valid, and calculates the angles between adjacent candidate symmetry axes (i.e. the inter-axial angles) when the number of valid candidate symmetry axes is at least three.

Symmetrizing means 27, coupled to the output of means 26, judges whether all the inter-axial angles are within a predetermined range of angles. The symmetrizing means 27 modifies the features of the graphic, as discussed in more detail below, so that the graphic becomes axis-symmetric (e.g., "axisymmetrical"), which occurs when all of the inter-axial angles are within the predetermined range of angles.

Below, the operation of the graphic-shaping apparatus and method according to the first preferred embodiment will be described with reference to the flow chart shown in FIG. 2A and 2B and the graphic shown in FIG. 3A.

Figures 3A, 3B:
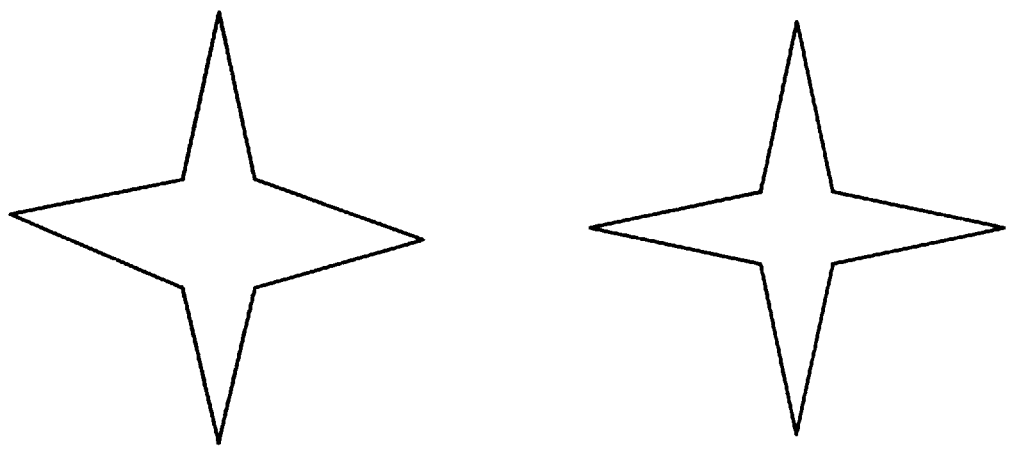
FIG. 3A illustrates a graphic.
FIG. 3B illustrates the graphic after shaping according to the method and apparatus of the first preferred embodiment of the present invention.

First, in step f1 when a graphic of the configuration illustrated in FIG. 3A is input, features of the graphic, including the coordinates of the vertexes, the angles and the lengths of the sides, etc., are calculated by the feature-quantum calculation means 19 and stored in storage device C. The graphic may be directly output to the output device D.

In step f2, the candidate symmetry-axis calculation means 20 refers to the coordinates of the vertexes stored in the storage device C, and uses the coordinates of the vertexes and the midpoints of the sides to calculate all possible candidate symmetry axes.

Figure 4:
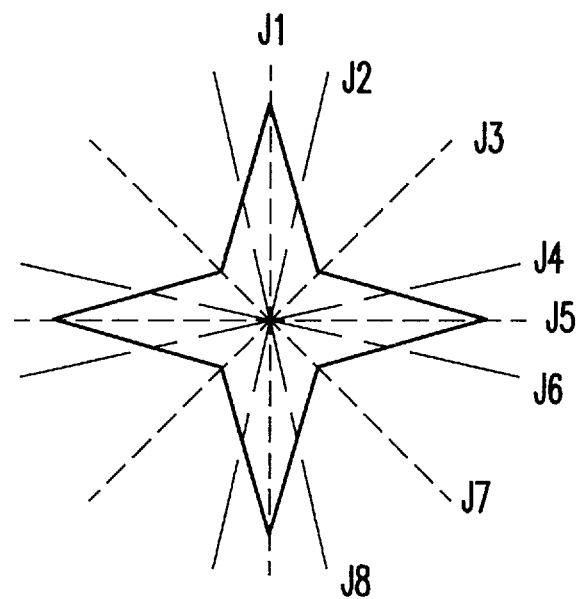
FIG. 4 illustrates axisymmetrical shaping according to the method and apparatus of the first preferred embodiment of the present invention.

In this example, there are eight possible candidate symmetric axes which are indicated by J1–J8 in FIG. 4. These eight possible candidate symmetric axes pass through the paired vertexes and the paired midpoints of the graphic. J1, J3, J5 and J7 are candidate symmetric axes which pass through the vertexes, while J2, J4, J6 and J8 are candidate symmetric axes which pass through the midpoints.

In step f3, it is determined whether there are any other remaining possible candidate symmetric axes which have not been evaluated for symmetry. If all candidate symmetric axes have been evaluated (e.g., a "NO" in step f3), then the process proceeds to step f11. If there are still remaining candidate symmetric axes to be evaluated for symmetry (e.g., a "YES" in step f3), the process loops through steps f4 through f10.

Figure 5:
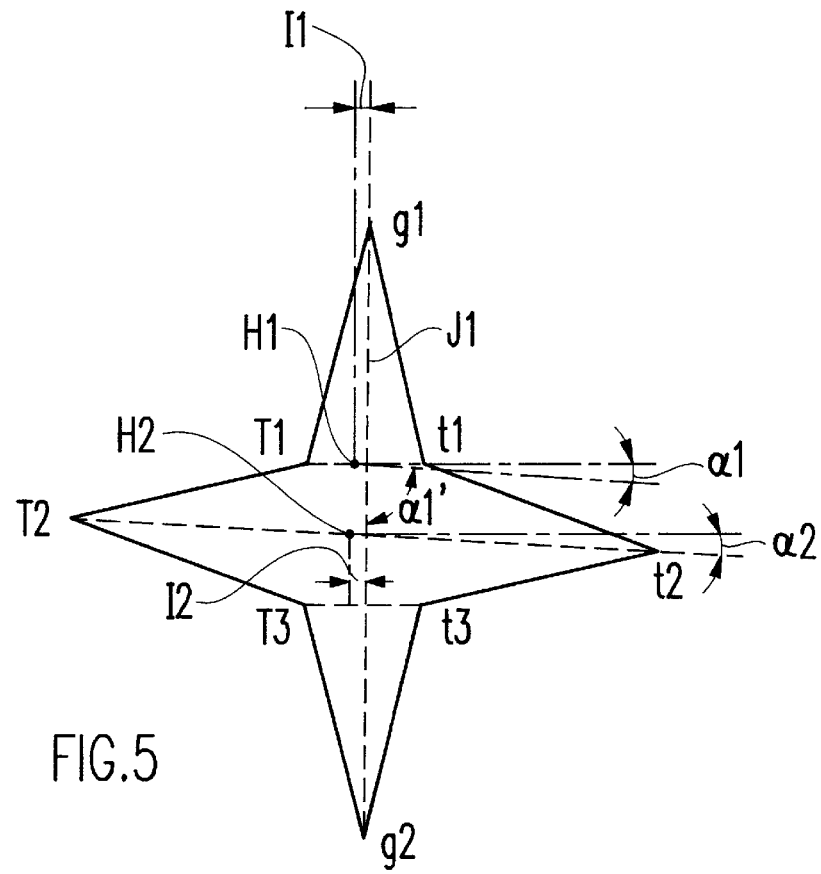
FIG. 5 illustrates axisymmetrical shaping according to the method and apparatus of the first preferred embodiment of the present invention.

In step f4, the various candidate symmetric axes are sequentially evaluated for symmetry. As illustrated in FIG. 5, the symmetry evaluation process begins with one candidate symmetry axis (i.e., J1) being selected by the candidate-symmetry-axis-for-judgement selection means 21.

Opposing vertexes on each side of the selected symmetry axis J1 are matched as pairs. The segment-for-judgement calculation means 22, moves in succession in the direction from one of the ends of the selected symmetry axis (i.e., g1) to the other end g2. The first two opposing vertexes most adjacent the end g1 are matched (i.e., T1 and t1) and a line segment is drawn between vertexes T1 and t1.

Similarly, line segments which join the other respective paired vertexes which have been traced in "n" (n is a positive integer) steps are drawn to calculate, in this example, three segments for judgement of symmetry (T1-t1, T2-t2 and T3-t3). The characteristics of each of these line segments are stored, in a manner known to those ordinarily skilled in the art, for future reference and evaluation.

In step f5, it is determined whether any of the segments drawn by the segment-for-judgment calculation means 22 remain to be checked for symmetry. If all have been checked (e.g., a "NO" in step t5), the processing proceeds to f9. If segments remain to be checked (e.g., a "YES" in step f5), each segment is individually processed through the loop of steps f6 through f8.

In step f6, the coordinates of the midpoints (i.e., H1, H2, etc.) of the segments (i.e., T1-t1, T2-t2, etc.) are determined, and the distances (i.e., I1, I2, etc.) between the midpoints (i.e., H1, H2, etc.) and the candidate symmetric axes J1 are calculated by the distance-to-symmetry-axis calculation means 23.

In step f7, the angles (i.e., α1', etc.) between each segment (i.e., T1-t1, T2-t2, etc.) and the selected candidate symmetric axis J1 are calculated by the symmetric-axis-forming-angle calculation means 24.

In step f8, the angular difference (i.e., α1, α2, etc. in terms of absolute value) between the above-mentioned angle α1' and 90 degrees is calculated. This calculation produces the angle between the segment and a line perpendicular to the selected candidate symmetric axis. The process then returns to step f5 and the next line segment is analyzed for the angular difference and the midpoint distance. The angular difference and the midpoint distance is associated with each line and temporarily stored for future reference in a manner well known to those ordinarily skilled in the art.

In step f9, the distances from the midpoints and the angular differences for all of the different line segments which intersect the selected symmetry axis are determined by the symmetry-judging means 25. These values may be determined by calculating the total, average, median, variance or other methods of determining values well known to those ordinarily skilled in the art.

For example, the "average" calculation is illustrated below. Specifically, in an example using an "average", assume that the distances from the midpoints to the selected symmetry axis are as follows: I1=1, I2=3, I3=2; and that the angular differences from the normal to the selected symmetry axis are as follows: α1=5, α2=1 and α3=0. Given such values, the calculation for judging the values could be performed by averaging the values such that, the average of I1–I3 is 2, while the average of the angular differences α1–α3 is 2.

As mentioned above, in lieu of the average, the "median", "variance", etc. could also be employed similarly as would be known by one of ordinary skill in the art within the purview of the present application.

In step f10, it is determined whether the selected symmetry axis axisymmetrically divides the graphic (within an allowable variation). The allowable variation depends on the designer's individual requirements and specifications. When the calculated distances and the angular differences are lower than respective predetermined threshold values, the graphic is considered an "axisymmetrical" graphic with respect to the selected candidate symmetric axis J1. When the differences exceed the threshold values, the graphic is not axisymmetrical. When an average or a variance is used, the degree of symmetry increases as the threshold values approach zero.

For example, the graphic could be evaluated to be axisymmetrical with respect to the candidate symmetry axis J1 when the average of the values is 3 or less. Here, since the averages of the distances and the angular differences are each 2, the graphic illustrated in FIG. 3(A) is axisymmetrical with respect to the candidate symmetry axis J1. Hence, the candidate symmetry axis J1 is "valid" as an axis of symmetry of the graphic.

After such a determination, information regarding the axisymmetrical status is associated with the selected candidate symmetric axis and stored in a manner well-known to those ordinarily skilled in the art. Then the process returns to step f3 and a subsequent candidate symmetry axis is evaluated for symmetry.

Figure 6:
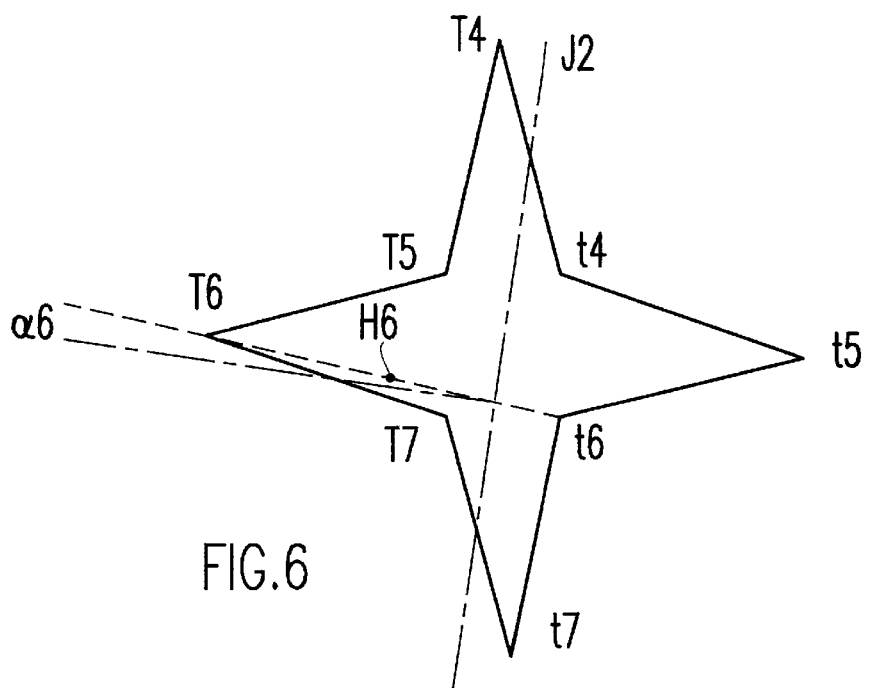
FIG. 6 illustrates axisymmetrical shaping according to the method and apparatus of the first preferred embodiment of the present invention.

Specifically, the candidate symmetry axis J2 is then selected as illustrated in FIG. 6, and steps f3–f10 are repeated. The line segments which are selected this time are T4-t4 through T7-t7 (note that, for clarity, only line segment T6-t6 is illustrated). Distances I4–I7 and angular differences α4–α7 are calculated in a like manner as with candidate symmetry axis J1.

In the example shown in FIG. 6, the average of the distances is 6, and the average of the angular differences is 4.5 degrees. Therefore, the candidate symmetry axis J2 is not axisymmetrical and is not a valid axis of symmetry of the graphic, since the averages are not 3 or less.

The candidate symmetry axes J2 through J8 are successively selected, and steps f3–f10 are repeated to calculate the distance I and the angular difference a for each of the segments, and it is determined whether the selected symmetry axis is axisymmetrical. It is noted that, instead of being evaluated sequentially as described above, steps J2 through J8 can be performed in parallel (i.e., each of the candidate symmetry axes may be evaluated for symmetry simultaneously).

Upon completion of steps f3–f10, the four candidate symmetry axes J1, J3, J5 and J7 of the graphic illustrated in this example (i.e., FIG. 4) are determined to be valid symmetry axes (i.e., axisymmetrical).

By virtue of the determination in step f3 that no candidate symmetry axes remain to be evaluated, the process moves to step f11.

In step f11, the first angle-between-valid-symmetry-axes calculation means 26 determines the number of candidate symmetry axes which are valid, and the process proceeds to step f12 when the number of valid symmetry axes is less than 3 (e.g., a "NO" in step f11), whereas the process proceeds to step f13 when the number is 3 or greater (e.g., a "YES" in step f11).

In step f12, the process is terminated because the graphic is judged to be a graphic which does not need to be shaped for axis symmetry. It is noted that it is unnecessary to shape a graphic with 2 or less valid symmetry axes. Simply, it is more accurate to shape a graphic with three symmetrical axes than with two or less.

In step f13, the inter-axial angles between each adjacent valid symmetry axes are measured. In this example, it is assumed that the angle between the valid symmetry axes J1 and J3 is 45 degrees, the angle between the valid symmetry axes J3 and J5 is 43 degrees, the angle between the valid symmetry axes J5 and J7 is 47 degrees and the angle between the valid symmetry axes J7 and J1 is 44 degrees.

In step f14, the angles between the valid symmetry axes are evaluated. When the calculated inter-axial angles are within a predetermined range of angles, the process proceeds to step f15, and otherwise the process proceeds to step f16.

The predetermined range can vary, depending on, for example, the number of valid symmetry axes. In the example illustrated in FIG. 4, there are four valid symmetry axes. Therefore, the predetermined range may be measured from a standard of 45 degrees (i.e., 180°/4=45°). It is noted that other standards could be utilized to determine if the inter-axial angles are within an acceptable range. For example, a standard could be established where all the angles must be within a certain number of degrees of each other, as opposed to a predetermined angle. Thus, a slight variance between the angles would be acceptable.

For example, if the acceptable tolerance from 45 degrees is 3 degrees or lower, all the angles between the adjacent valid symmetry axes in the example shown in FIG. 4 would be considered acceptable. Alternatively, a variance or the like may be calculated instead of the predetermined range of angles. The "variance" of the differences between each inter-axial angle and the degree of 180/n could be used, where n is the number of symmetry axes.

In step f15, the symmetrizing means 27 adjusts the coordinates of the vertexes of the graphic, so that the graphic becomes axisymmetrical with respect to all the valid symmetry axes J1, J3, J5 and J7.

After shaping, the graphic of FIG. 3A is modified to the graphic illustrated in FIG. 3B. The graphic illustrated in FIG. 3B is then output to the output unit D from the storage unit C in place of FIG. 3A.

Alternatively, if it is determined in step f14 that the inter-axial angles are not within the predetermined range, the processing moves to step f16 where the process is terminated because the graphic is judged not to be an object which requires shaping for axis symmetry. The graphic is not shaped when the inter-axial angles are outside the predetermined range because this would distort the image excessively.

Second Embodiment of Data-Processing Unit

A second embodiment of the data-processing unit B will be described now with reference to FIG. 7. Like components described with reference to FIG. 1 are indicated with like reference numerals and explanation of the same has been omitted for clarity and brevity.

The data-processing unit E is similar to data-processing unit B, except for the addition of segment-validity judgement means 28. Segment-validity judgement means 28 receives outputs from the distance-to-symmetry-axis calculation means 23 and the angle-between-symmetry-axes calculation means 24, and provides an output to the candidate symmetry-axis-for-judgment selection means 21.

According to the first embodiment illustrated in FIG. 1, for each candidate symmetry axis, the distance-to-symmetry-axis calculation means 23 and the symmetry-axis-forming-angle calculation means 24 calculated all the distances from the midpoints and the angular differences for each of the line segments generated by the segment-for-judgment calculation means 22. Then, the validity of each candidate symmetry axis is evaluated by the symmetry-judging means 25.

Figure 7:
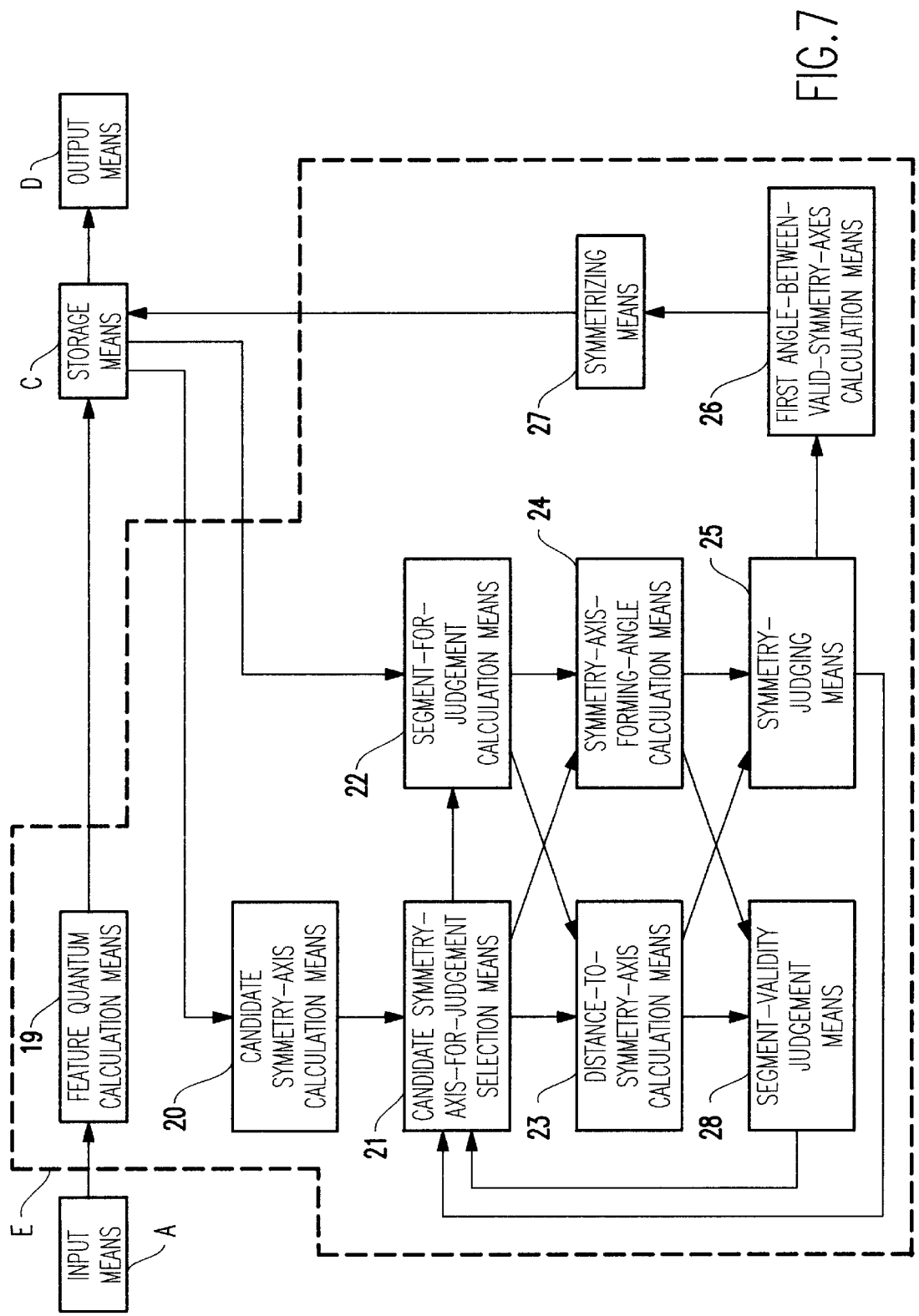
FIG. 7 is a block diagram illustrating a second embodiment of the data-processing unit for the graphic-shaping apparatus of FIG. 1.

However, according to the second embodiment illustrated in FIG. 7, after the distance from the midpoint and the angular difference have been calculated for one line segment, the segment-validity judgement means 28 immediately determines whether these values exceed predetermined threshold values. The predetermined threshold values are stored in means 28 and are selected according to the value near 0.

If these values exceed the threshold values, the selected symmetry axis is immediately considered invalid and processing continues for the next sequential candidate symmetry axis. If these values do not exceed the threshold values (e.g., if the line segment is valid), then the subsequent line segments for the selected symmetry axis are evaluated.

Figure 8A:
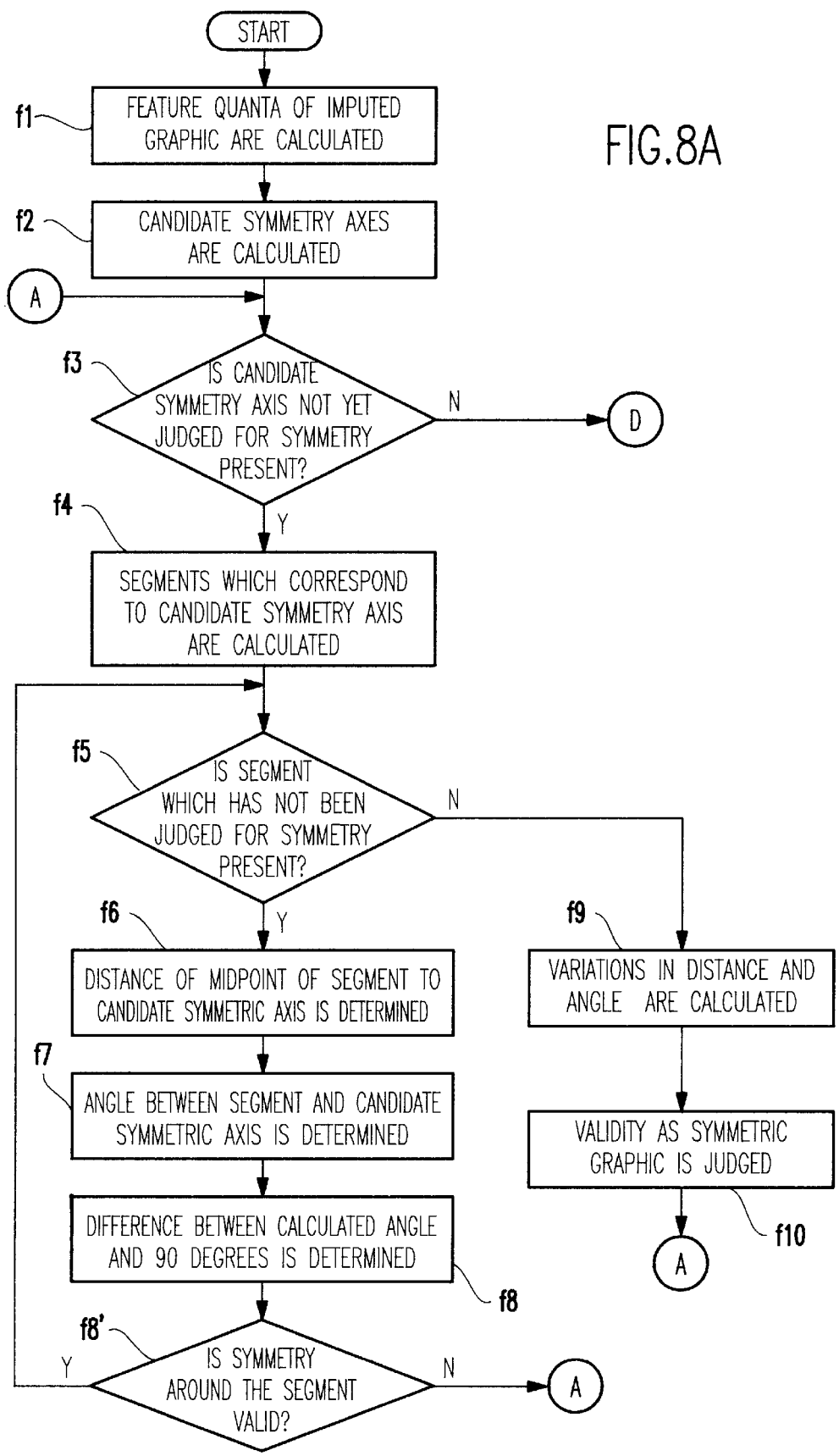
FIGS. 8A and 8B, taken together are a flow chart illustrating an operation of the graphic-shaping apparatus having the data-processing unit shown in FIG. 7.
Figure 8B:
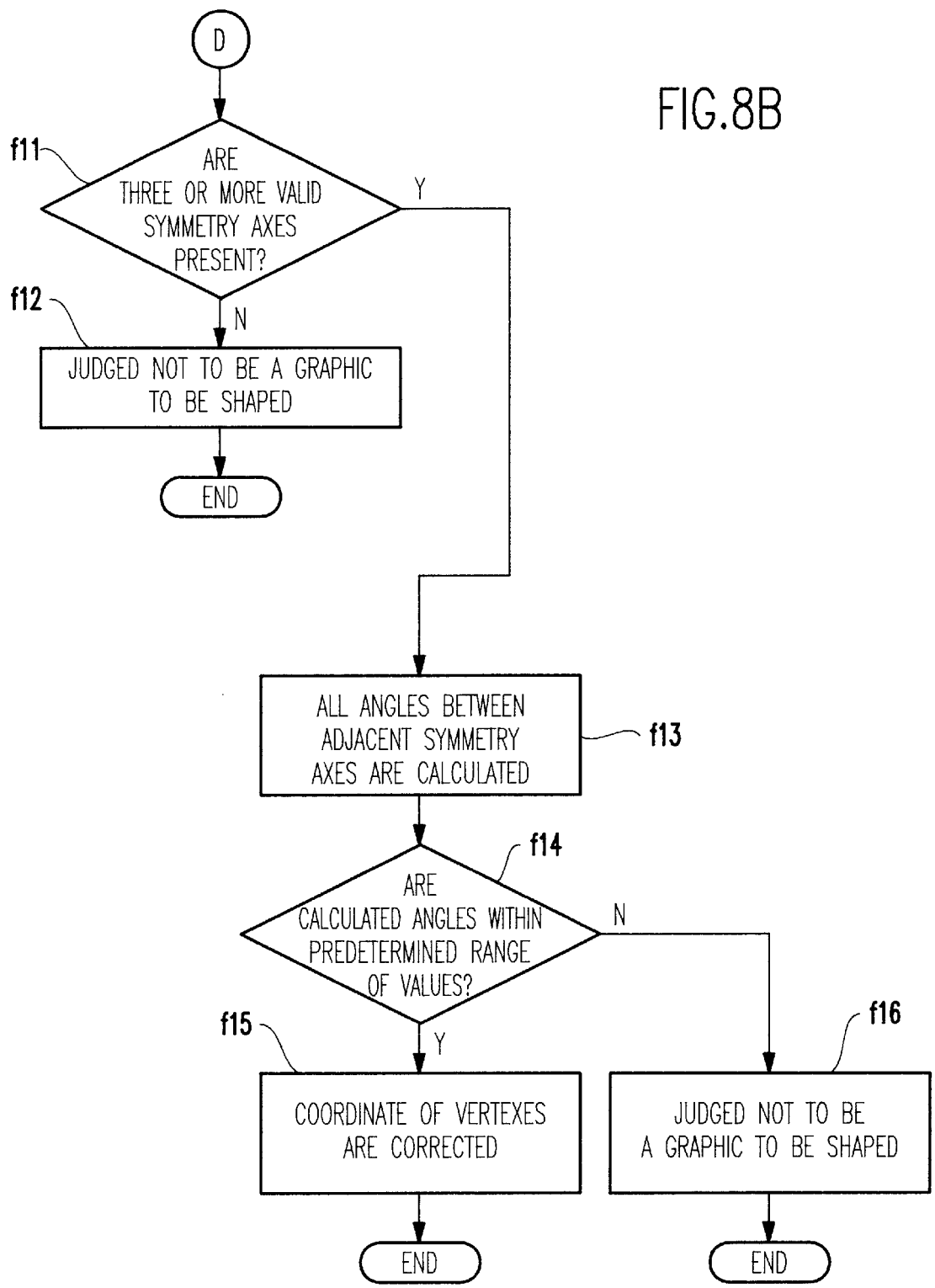

Below, the operation of the segment-validity judgement means 28 is described with reference to FIGS. 8A and 8B. The flow chart shown in FIG. 8A is different from that shown in FIG. 2A in that step f8' has been added after step f8.

In step f8', the distance calculated in step f7 and the angular difference calculated in step f8 are evaluated to determine if they exceed predetermined threshold values. When the distance and angular difference are less than or equal to the respective threshold values, the process returns to step f5 to process the next sequential line segment.

On the other hand, when the respective values of the distance and the angular difference exceed the threshold values, the process returns to step f3 to process the next sequential candidate symmetry axis.

The segment-validity judgement means 28 evaluates a candidate symmetry axis by testing at least one line segment and if one of the line segments is valid, then the selected symmetry axis is likely to be a valid symmetry axis, while the invalidity of one line segment indicates that the selected symmetry axis is likely to be an invalid symmetry axis. Specifically, if one line segment is invalid, the candidate symmetry axis is judged to be necessarily invalid.

Since implementation of the process in step f8' results in earlier resolution (and possible discard or removal) of a candidate symmetry axes which cannot provide symmetry, the processing speed is higher and more efficient than the first embodiment illustrated in FIG. 1.

The segment-validity judgment means 28 invalidates the selected symmetry axis when the first line segment whose distance and angular difference exceeds the threshold values appears.

Third Embodiment of Data-Processing Unit

Figure 9:
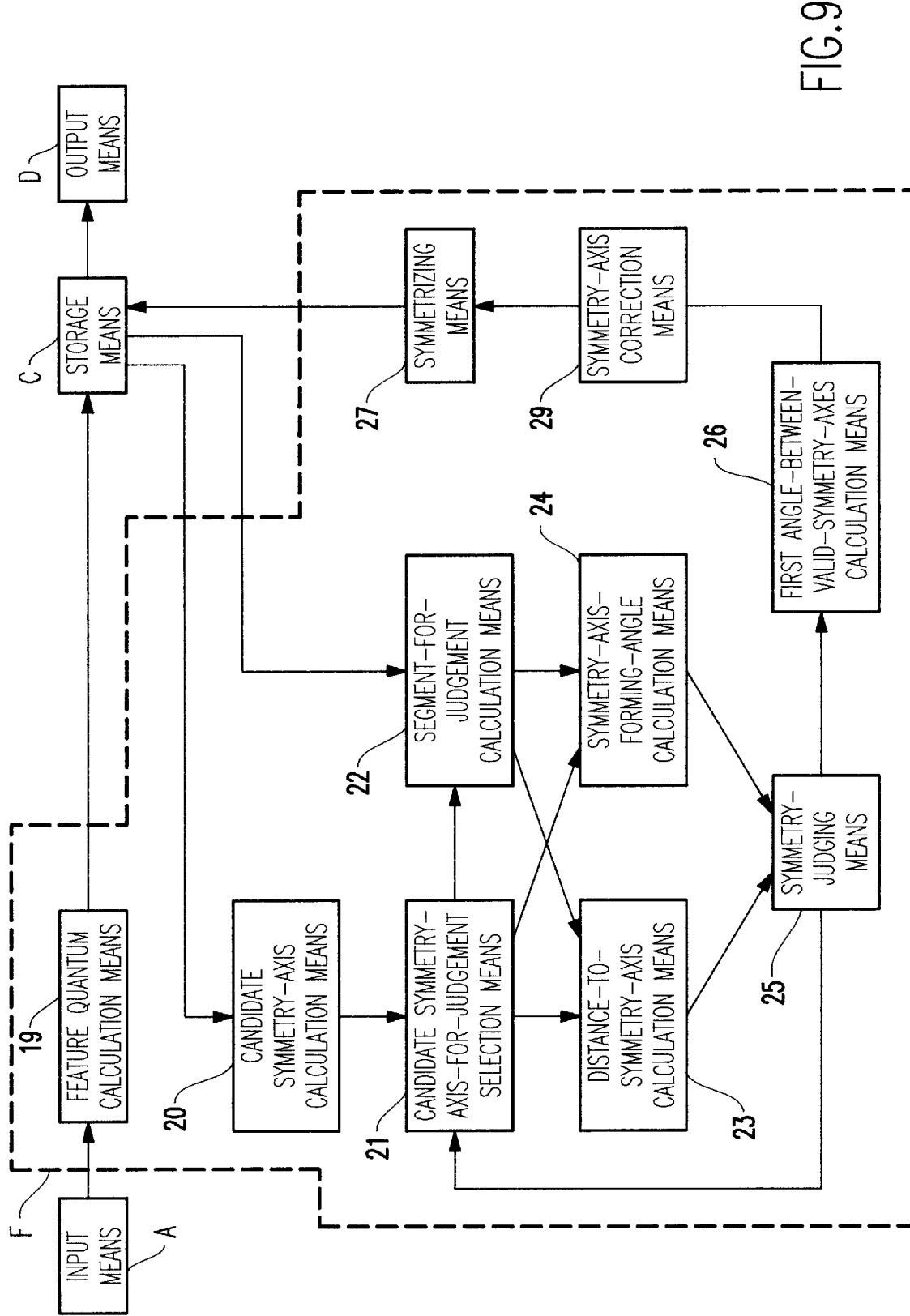
FIG. 9 is a block diagram illustrating the graphic-shaping apparatus provided with a third embodiment of the data-processing unit according to the present invention.

A third embodiment of the data-processing unit B will now be described with reference to FIG. 9. A data-processing unit F includes symmetry-axis correction means 29 between the first angle-between-valid-symmetry-axes calculation means 26 and the symmetrizing means 27.

The symmetry-axis correction means 29 determines whether a nearly (e.g., substantially) horizontal or nearly vertical valid symmetry axis is present. For purposes of this application, "nearly horizontal" means approximately±10 degrees to a horizontal parallel line, whereas "nearly vertical" means approximately±10 degrees to a vertical parallel line. Obviously, the less angular difference the better. Further, the differential between a "nearly horizontal" and a "horizontal", and the differential between a "nearly vertical" and a "vertical" may be freely set by the designer according to system/user requirements and constraints.

When a nearly horizontal or nearly vertical candidate symmetry axis is present, the symmetry-axis correction means 29 corrects gradients of the other valid symmetry axes so that the nearly horizontal or nearly vertical valid symmetry axis can be horizontal or vertical. If possible, the gradients of the valid symmetry axes are adjusted so that there is both a horizontal valid symmetry axis and a vertical valid symmetry axis. As with the adjustments shown in FIG. 3B, the coordinates of the various vertexes are adjusted to modify the gradients of the valid symmetry axes.

Below, the operation of a graphic-shaping apparatus having the data-processing unit F including the symmetry-axis correction means 29 is described with reference to FIGS. 10A and 10B.

Figure 2A:
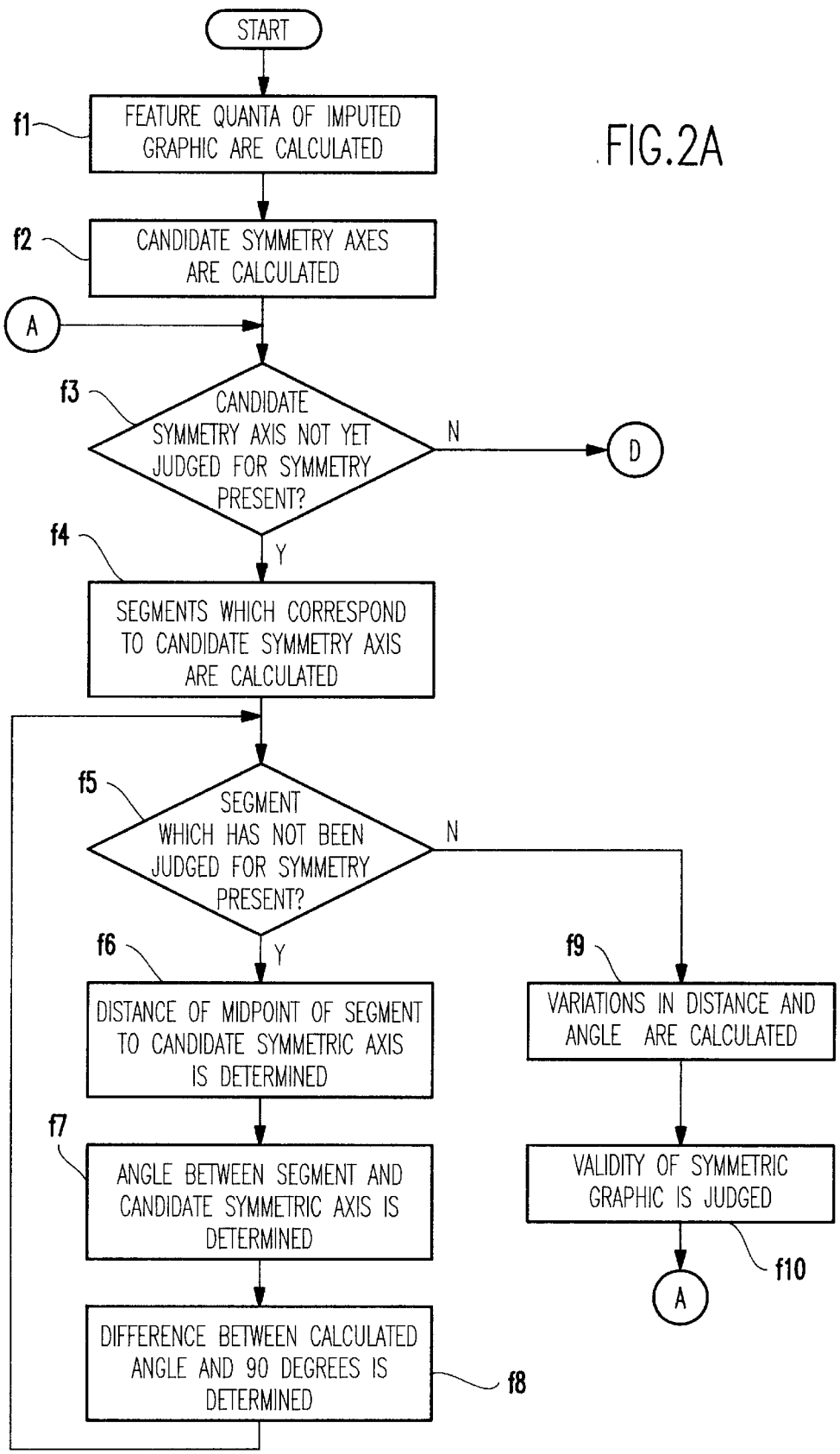
FIGS. 2A and 2B, taken together, are a flow chart illustrating the operation of the graphic-shaping apparatus according to the present invention shown in FIG. 1.
Figure 2B:
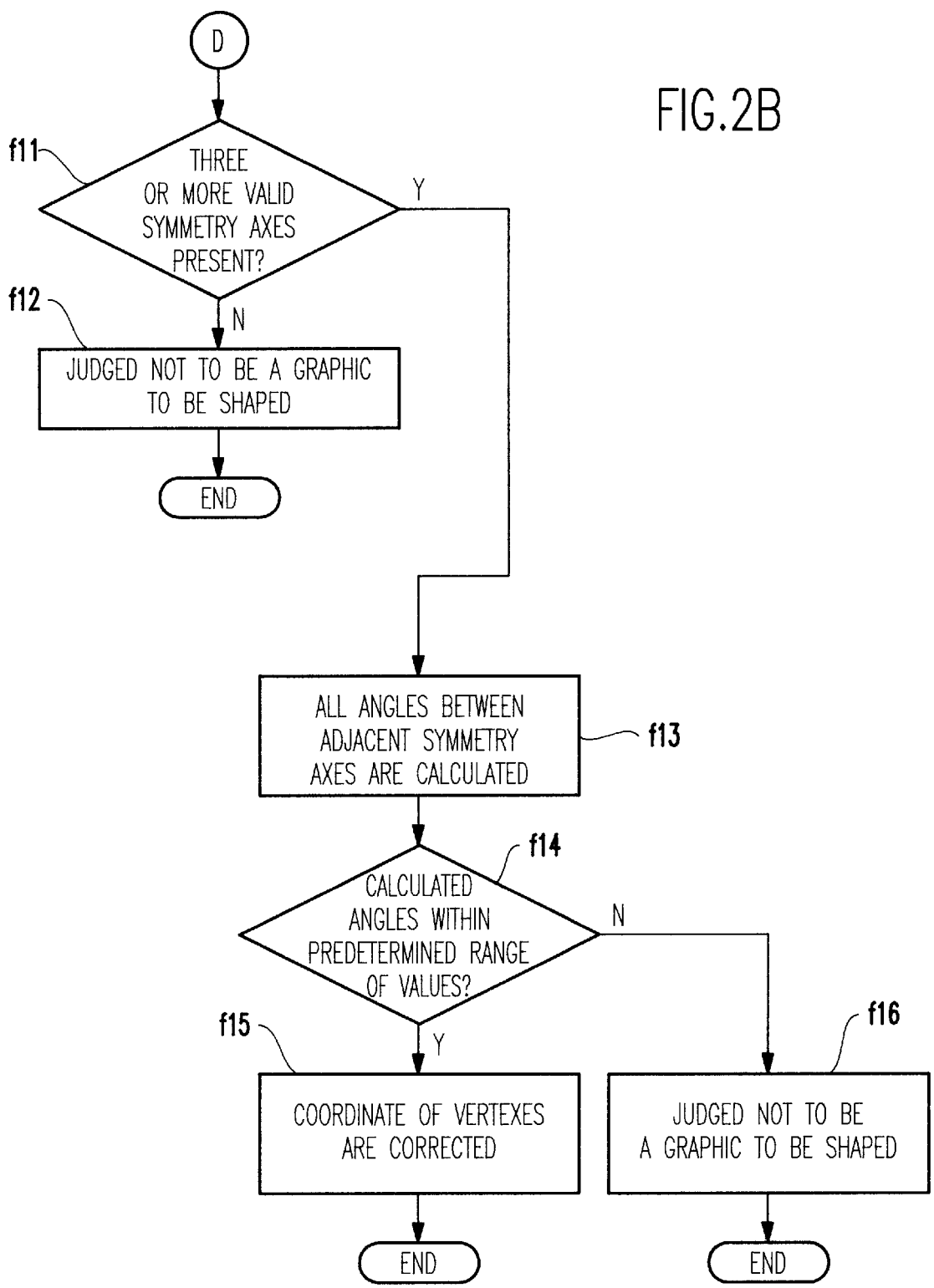
Figure 10A:
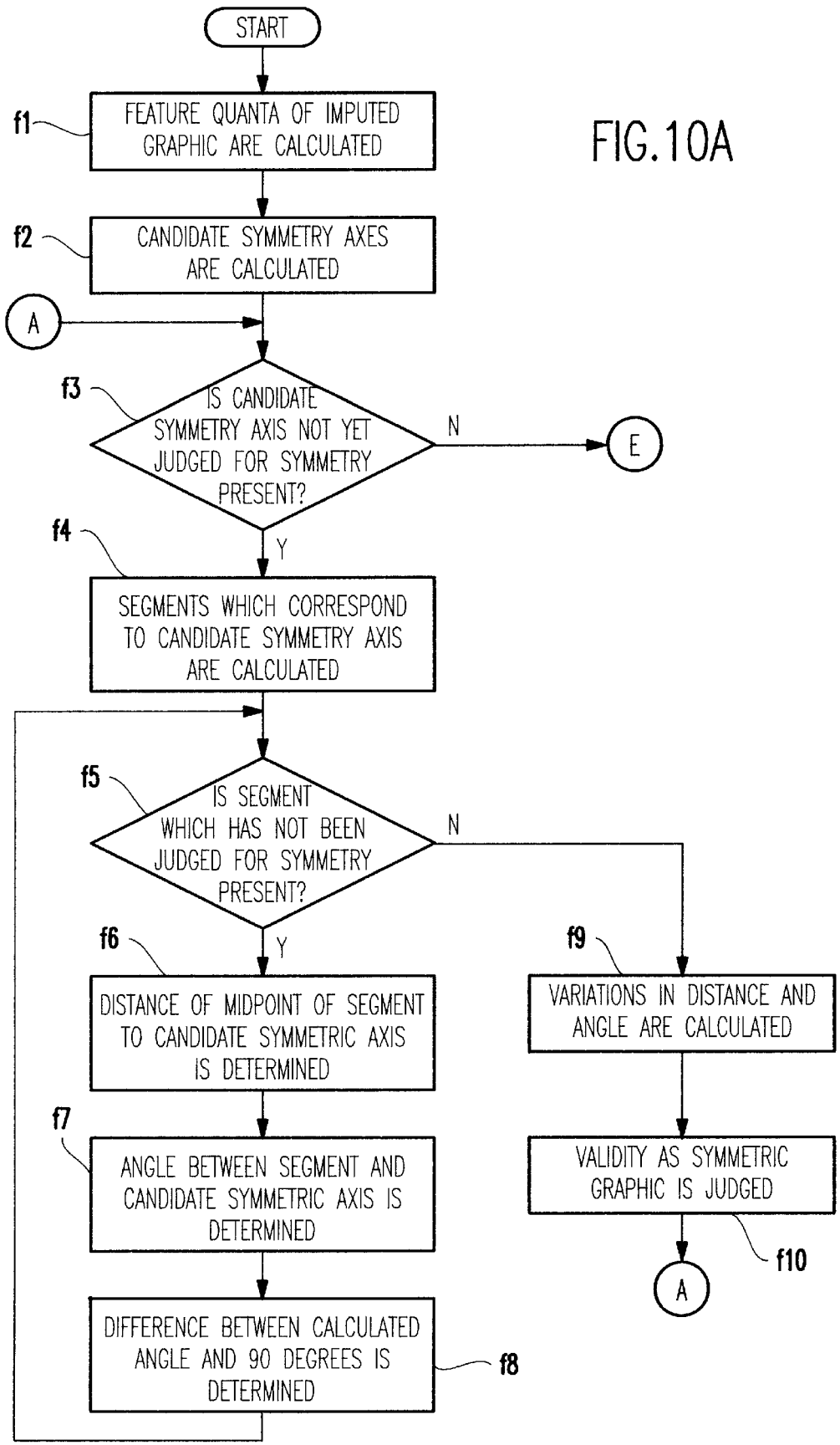
FIGS. 10A and 10B, taken together, are a flow chart illustrating an operation of the graphic-shaping apparatus having a data-processing unit of the third embodiment as shown in FIG. 9.
Figure 10B:
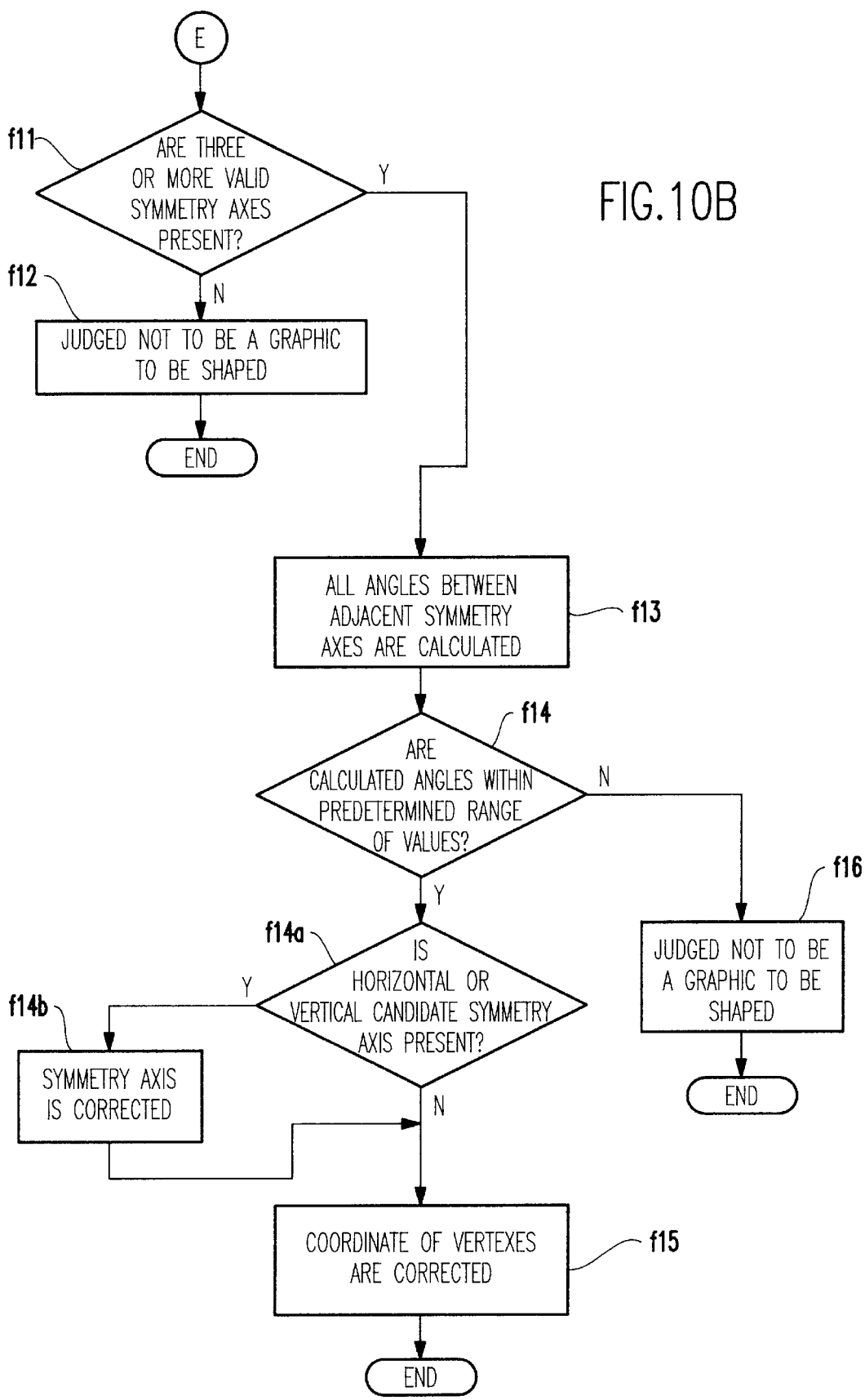

The flow chart shown in FIGS. 10A and 10B is different from the flow chart shown in FIGS. 2A and 2B in that steps f14a and f14b are inserted between steps f14 and f15 of FIG. 2B. Once again, the description of the elements illustrated in FIG. 9 and steps in FIGS. 10A and 10B which are the same as those shown in FIGS. 1 and 2, respectively, is omitted here for sake of clarity and brevity.

In step f14, the first angle-between-valid-symmetry-axes calculation means 26 determines whether inter-axial angles between the adjacent valid candidate symmetry axes are within a predetermined range of angles.

If the inter-axial angles are within the predetermined range of angles (e.g., a "YES" in step f14), then the process proceeds to step f14a. Alternatively, if the inter-axial angles are not within the predetermined range of angles (e.g., a "NO" in step f14), then the process proceeds to step f16.

In step f14a, the symmetry-axis correction means 29 determines whether a nearly horizontal or nearly vertical valid symmetry axis is present. A nearly horizontal or nearly vertical valid symmetry axis is identified by calculating gradients between coordinates.

When a nearly horizontal or nearly vertical valid symmetry axis is present (e.g., a "YES" in step f14a), then the process proceeds to step f14b. When a nearly horizontal or nearly vertical valid symmetry axis is not present (e.g., a "NO" in step f14a), then the process proceeds to step f15.

In step f14b, the gradients of all the valid symmetry axes are corrected so that the nearly horizontal or nearly vertical valid symmetry axis is adjusted to be horizontal or vertical. If possible, the gradients of the valid symmetry axes are adjusted so that there is both a horizontal valid symmetry axis and a vertical valid symmetry axis. As with the adjustments shown in FIG. 3(B), the coordinates of the various vertexes are adjusted to modify the gradients of the valid symmetry axes. For example, the gradients are corrected/adjusted by finding the center point of a plurality of symmetry axes, and then rotating the graphic around the center point until the nearly horizontal axis overlaps the completely horizontal axis. The same operation is performed for the nearly vertical axis.

In step f15, the symmetrizing means 27 corrects the coordinates of the inputted graphic so that the graphic is axisymmetrical with respect to all the valid symmetry axes (including the corrected symmetry axes), while maintaining the vertical or horizontal valid symmetry axis.

Fourth Embodiment of Data-Processing Unit

A fourth embodiment of the data-processing unit B will be described with reference to FIG. 11. A data-processing unit G includes a symmetry-axes-to-be-verified-for-symmetry determination means 30 and a second angle-between-valid-symmetry-axes calculation means 31 in place of the first angle-between-valid-symmetry-axes means 26 illustrated in FIG. 1.

The symmetry-axes-to-be-verified-for-symmetry selection means 30 determines the number of candidate symmetry axes which must be checked for symmetry that are located between two valid candidate symmetry axes.

For example, verification proceeds in the order of the axes J1, J2, J3, . . . and J8 in FIG. 4. First, the axis J1 is determined as a valid symmetry axis. Secondly, the axis J2 is determined as an invalid symmetry axis and thirdly the axis J3 is determined as a valid symmetry axis. Thus, J1 is the first valid symmetry axis and J3 is the second valid symmetry axis. Then, the number of symmetry axes between the two valid symmetry axes J1 and J3 is counted. In this case, the number is one (e.g., namely, J2).

Nearly regular polygons or nearly regular shapes, for example, a shape in FIGS. 3A and 3B, are handled by the present invention. Generally, in regular polygons or regular shapes, there are always the same number of invalid symmetry axes between neighboring valid symmetry axes. In the present invention, this general rule is used in order to symmetrize the shapes.

In the example above, the axis J1 is determined as valid, the axis J2 is determined as invalid and the axis J3 is determined as valid. Thus, it is probable according to the above-mentioned general rule that the axis J4 is invalid and that the axis J5 is valid. Therefore, in this invention, as soon as the two valid symmetry axes J1 and J3 are found, the symmetry-axes-to-be-verified-for-symmetry selection means 30 defines the third valid symmetry axis J5 as a candidate-symmetry-axis-to-be-verified-for-symmetry without any determination of some invalid axes (e.g., J4).

The second angle-between-valid-symmetry-axes calculation means 31 calculates the inter-axial angle between the first and second valid symmetry axis J1 and J3 and the angle between the second and third valid symmetry axes J3 and J5. Accordingly, means 31 judges whether the calculated inter-axial angles are within the predetermined range.

The operation of a graphic-shaping apparatus having the data-processing unit G will be described with reference to FIGS. 12A and 12B. Here, the flow chart shown in FIG. 12A is different from the flow chart shown in FIG. 2A in that step f3' is provided as a branch from step f3, and steps g1–g7 are provided instead of steps f11–f16. The description of the elements illustrated in FIG. 11 and steps in FIG. 12 which are the same as those shown in FIGS. 1 and 2, respectively, is omitted here for sake of clarity and brevity.

In step f3, it is determined whether a candidate symmetry axis which has not been evaluated for symmetry is present. The process proceeds to step f4 when a candidate symmetry axis which has not been evaluated for symmetry is present (e.g., a "YES" in step f3).

When there are no remaining candidate symmetry axes to be evaluated (e.g., a "NO" in step f3), the process proceeds to step f3' and the process is terminated because the graphic cannot be shaped. As explained above, when less than three valid symmetry axes present, the graphic cannot be shaped. In step f10, it is determined whether the selected symmetry axis symmetrically divides the graphic (within an allowable variation, as set beforehand by the user/designer), and thus the validity of the symmetric graphic is judged, as discussed above, and the process proceeds to step g1.

In step g1, it is determined whether the candidate symmetry axis is a candidate symmetry axis to be verified for symmetry. When the candidate symmetry axis must be verified for symmetry (e.g., a "YES" in step g1), the process proceeds to step g5.

When the candidate symmetry axis has already been verified for symmetry (e.g., a "NO" in step g1), the process proceeds to step g2.

In step g2, the second angle-between-valid-symmetry-axes calculation means 31 determines whether two candidate symmetry axes have already been determined to be valid.

When the number of valid symmetry axes is less than 2 (e.g., a "NO" in step g2), the process returns to step f3 to select another candidate symmetry axis to continue the process. On the other hand, when two candidate symmetry axes have been determined to be valid (e.g., a "YES" in step g2), the process proceeds to step g3.

In step g3, it is determined whether a candidate symmetry axis to be verified for symmetry is present. When such an unevaluated candidate symmetry axis is present (e.g., "YES"), the process proceeds to step f4, and conversely when there are no remaining candidate symmetry axes to be evaluated (e.g., "NO"), the process proceeds to step g4.

In step g4, the process is terminated because the graphic is judged as not able to be shaped. As explained above, when there are less than three valid symmetry axes present, the graphic cannot be shaped.

In step g5, the second angle-between-valid-symmetry-axes calculation means 31 calculates inter-axial angles between the two adjacent valid symmetry axes and determines whether the measured angles are within a predetermined range of angles.

When the calculated inter-axial angles are within the predetermined range of angles, the process proceeds to step g6 (e.g., "YES" in step g5), and conversely proceeds to step g7 when the angles are not within the predetermined range (e.g., "NO" in step g5).

In step g6, the symmetrizing means 27 corrects the coordinates of the vertexes, as discussed above, so that the graphic is axisymmetrical with respect to the three valid candidate symmetry axes.

In step g7, the process is terminated because the graphic is judged as not being able to be shaped for axisymmetry as mentioned above.

Figure 11:
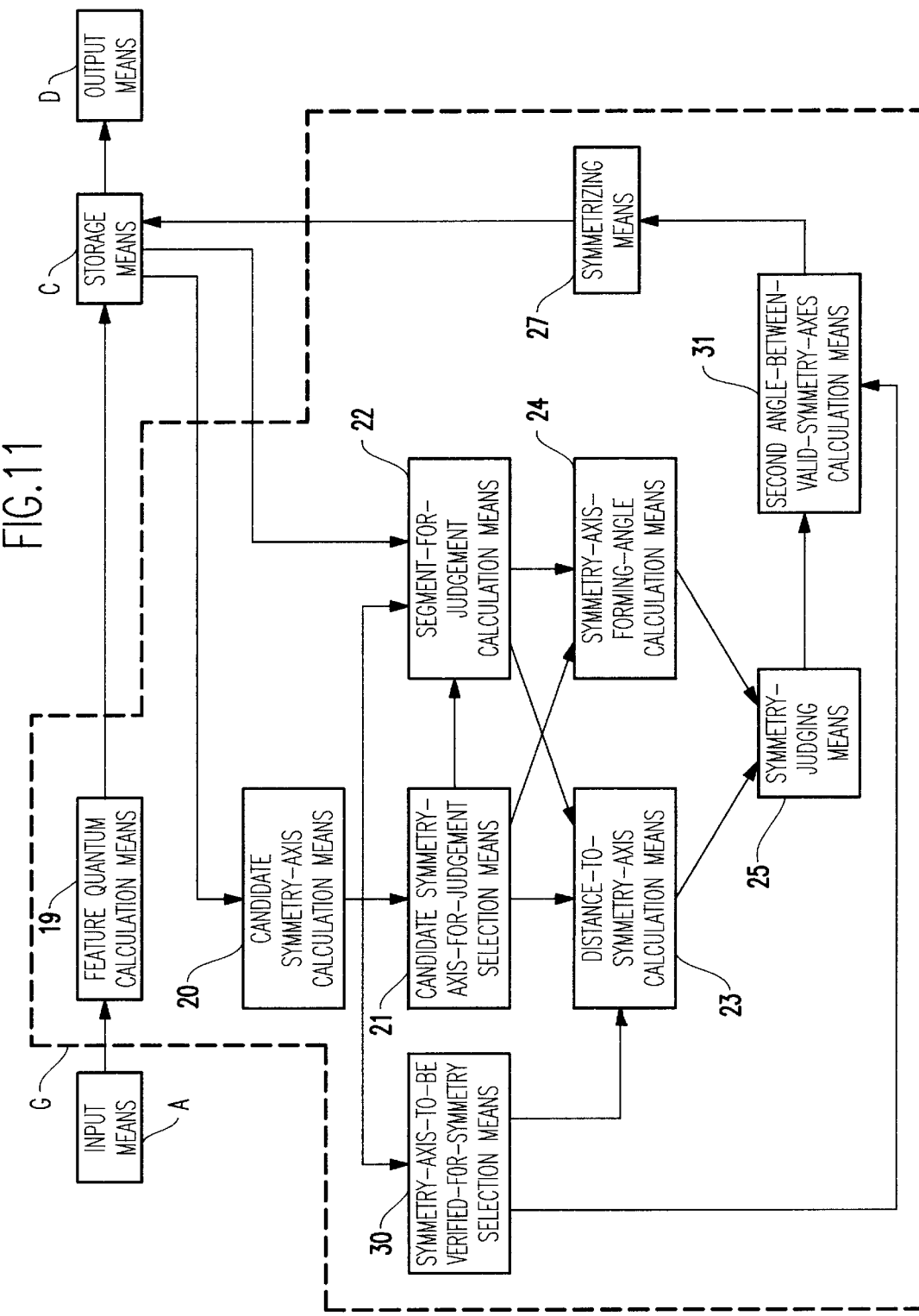
FIG. 11 is a block diagram illustrating the graphic-shaping apparatus provided with a fourth embodiment of the data-processing unit according to the present invention.
Figure 12A:
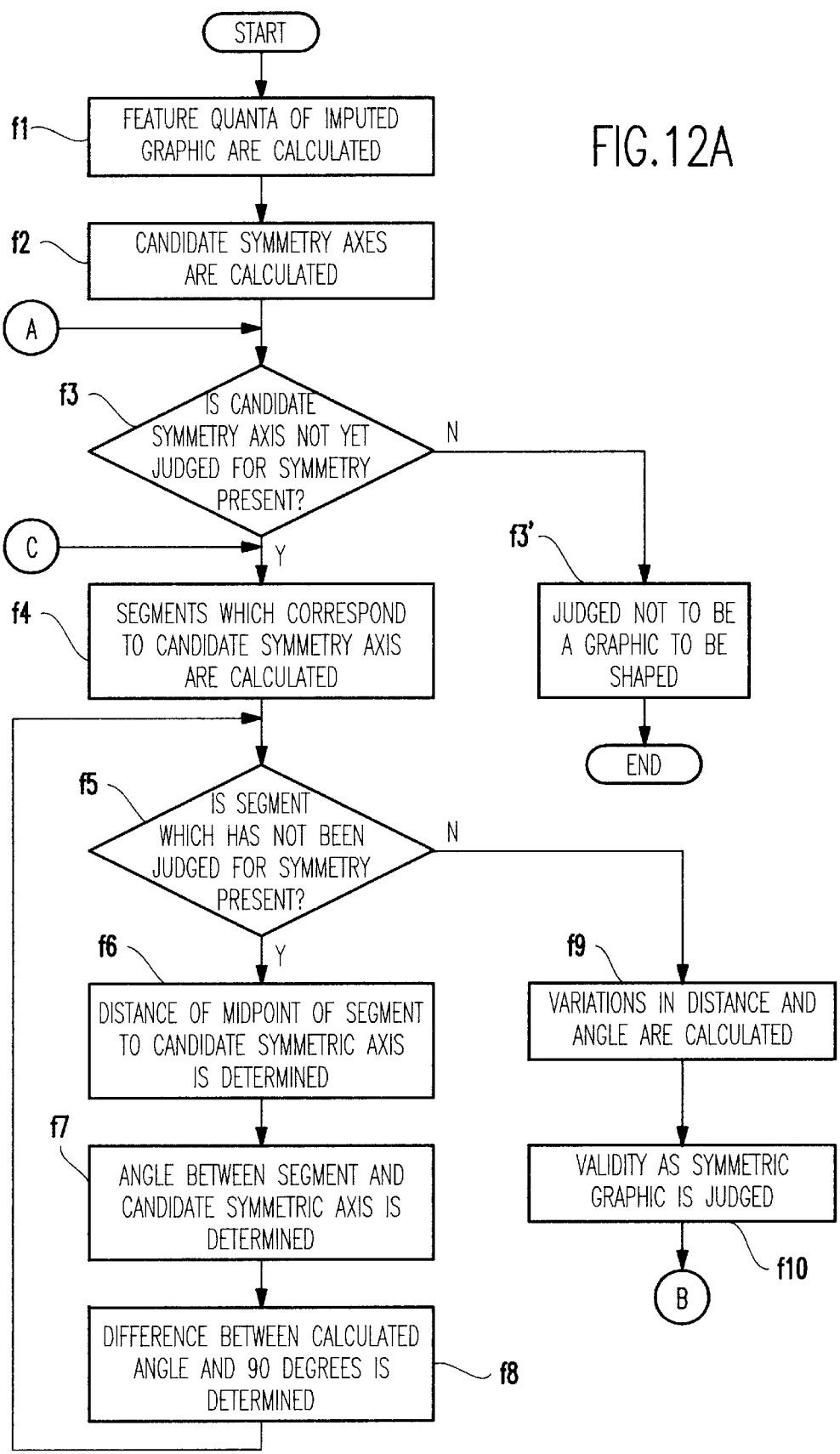
FIGS. 12A and 12B, taken together are a flow chart illustrating an operation of the graphic-shaping apparatus provided with a data-processing unit of the fourth embodiment as shown in FIG. 11.
Figure 12B:
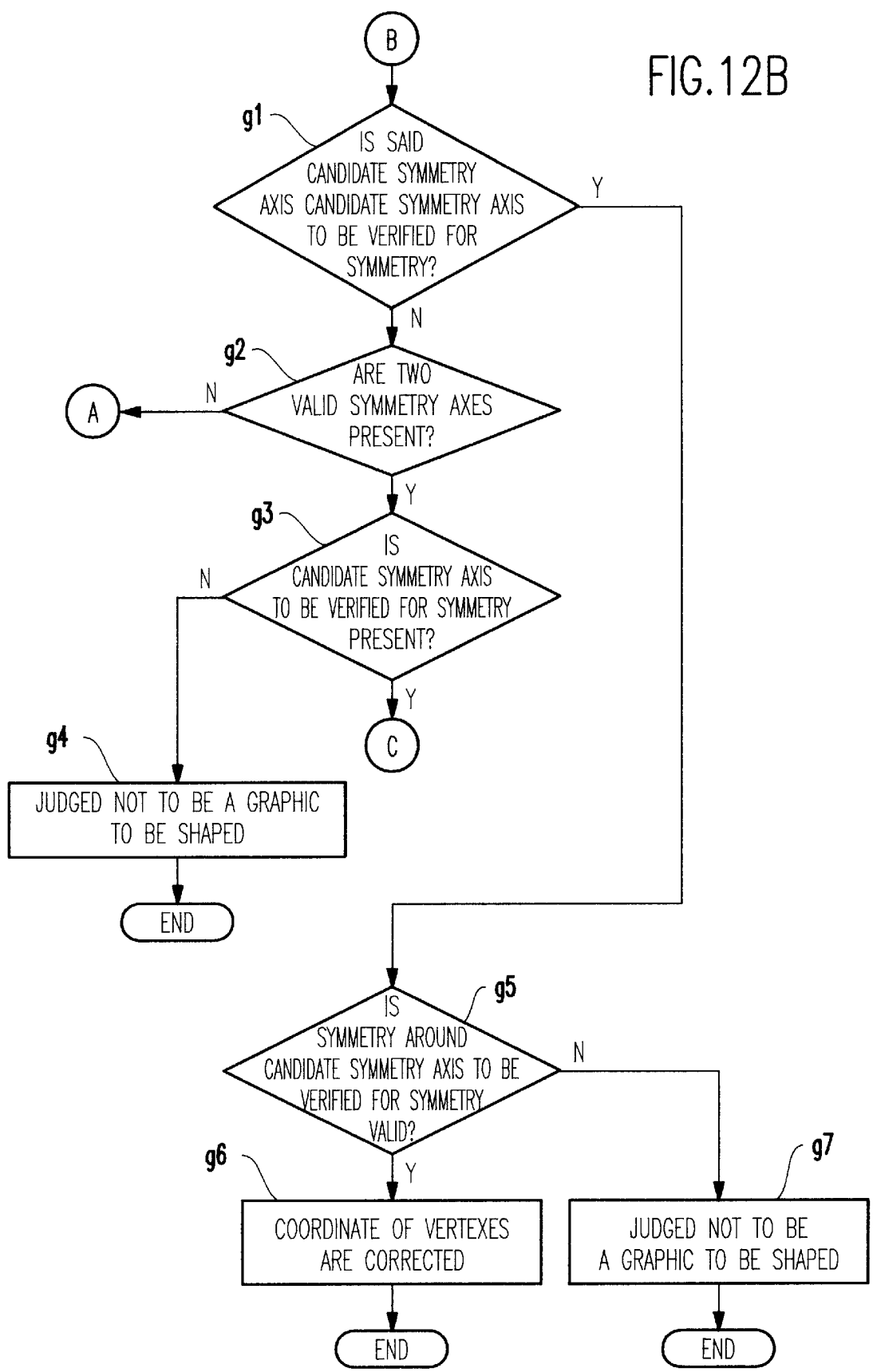

The embodiment illustrated in FIG. 11 allows early search of a minimum of three valid symmetry axes. This "early search" allows processing to proceed faster by allowing the process to stop at axis J5 since the process has already determined three valid symmetry axes. Thus, the processing can terminate once three valid symmetry axes are found.

Second Embodiment of Graphic-Shaping Apparatus

Figure 13:
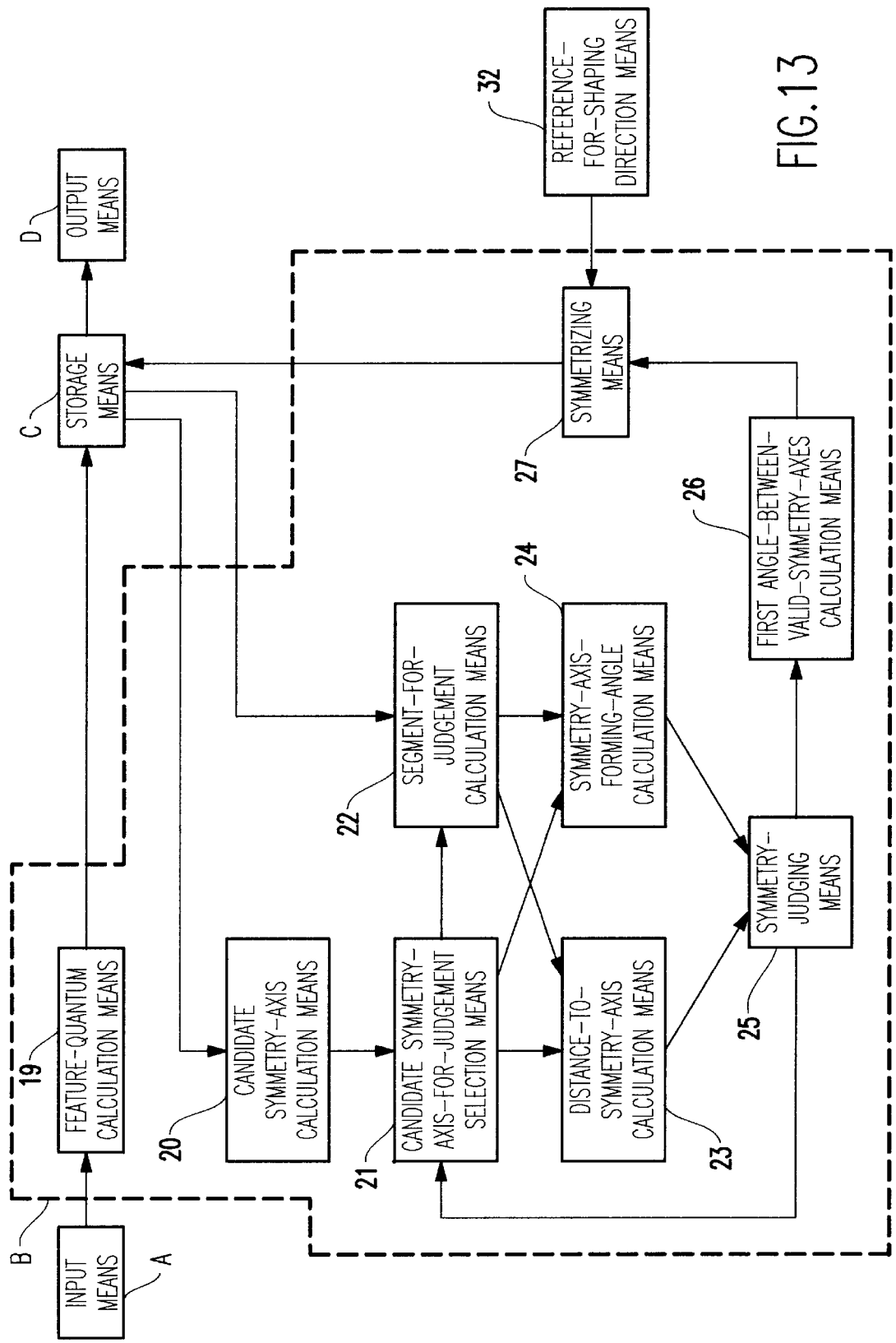
FIG. 13 is a block diagram illustrating a second embodiment of the graphic-shaping apparatus according to the present invention.

A second embodiment of the graphic-shaping apparatus will now be described with reference to FIG. 13. The graphic-shaping apparatus according to the second embodiment is similar to the first embodiment, but also includes a reference-for-shaping direction means 32.

The reference-for-shaping direction means 32 stores and produces standard features which are to be referenced when the graphic is being shaped for axisymmetry by the symmetrizing means 27. The comparison, storage, retrieval and use of the standard features is performed according to methods, and with devices, well-known to those ordinarily skilled in the art.

For example, the directions may include any or all of the following standard features:

1) Fix the position of the graphic, and place the symmetry axis into a position which matches the graphic;
2) Fix the position of the symmetry axis, and place the graphic into a position which matches the symmetry axis;
3) Refer to the coordinates of the vertexes on either side (right, left, upper or lower) of the symmetry axis for shaping; etc.;
4) Take an average of the coordinates of two vertexes opposing each other; and
5) Establish predetermined threshold values.

Figure 14A:
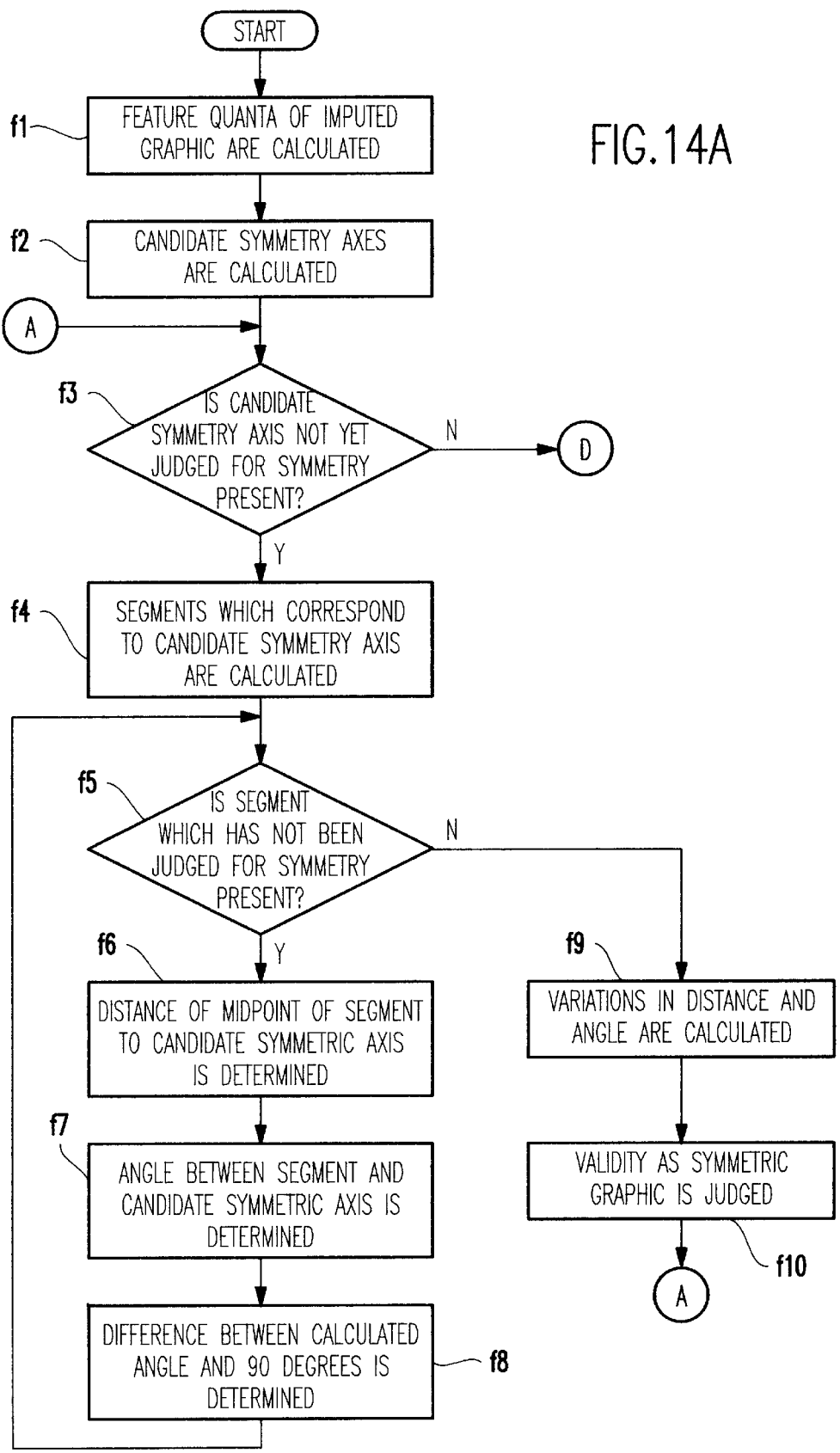
FIGS. 14A and 14B, taken together, are a flow chart illustrating an operation according to the second embodiment of the graphic-shaping apparatus according to the present invention shown in FIG. 13.

Below, the operation of the graphic-shaping apparatus including the reference-for-shaping direction means 32 is described with reference to FIGS. 14A and 14B.

Figure 14B:
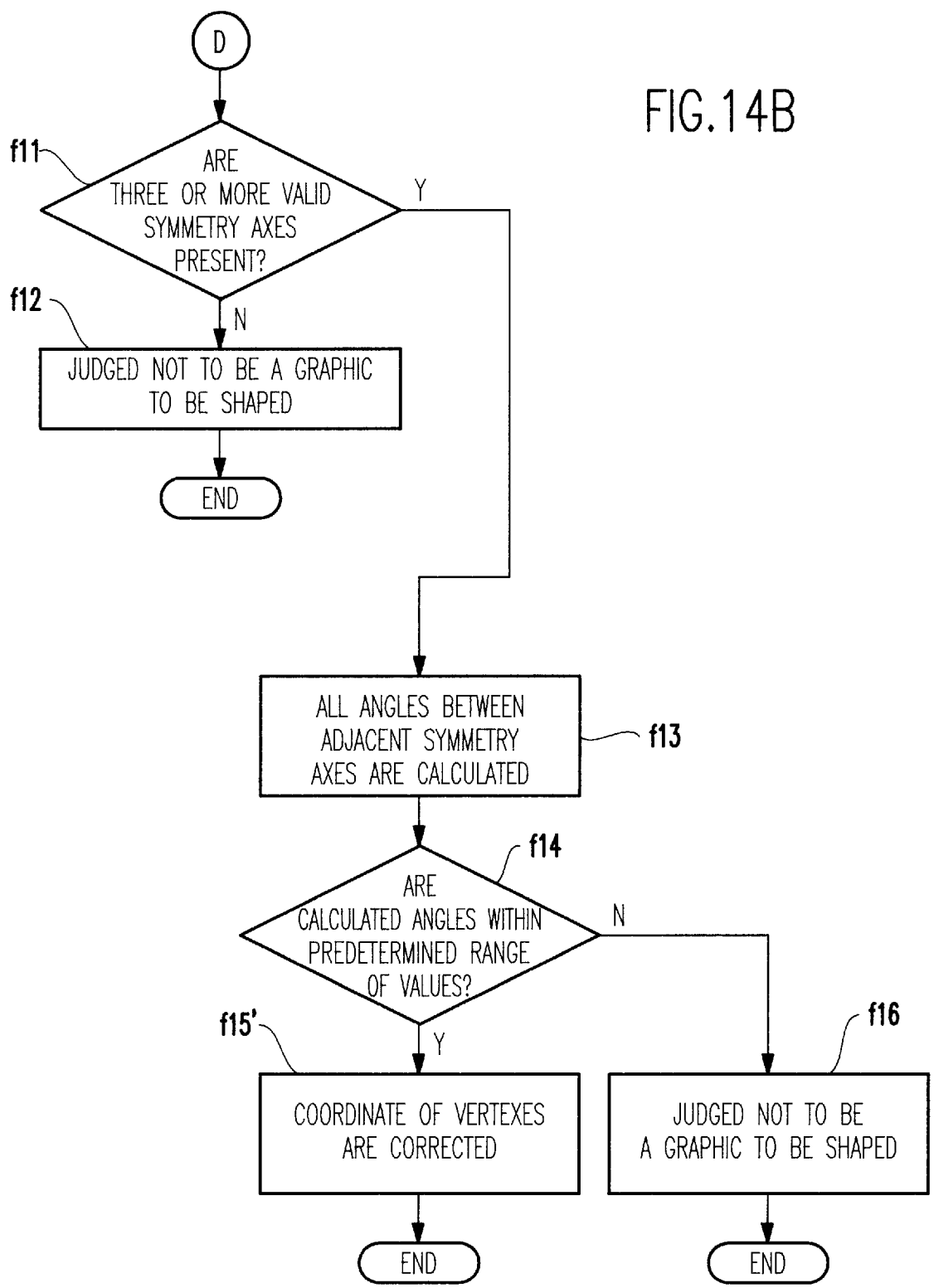

The flow chart shown in FIG. 14B is different from the flow chart shown in FIG. 2B in that step f15' is provided in place of step f15. The description of the elements illustrated in FIG. 13 and steps in FIG. 14 which are the same as those shown in FIGS. 1 and 2, respectively, is again omitted for sake of clarity and brevity.

In step f14, it is determined whether the angles between all the adjacent valid symmetry axes are within a predetermined range of values by the first angle-between-valid-symmetry-axes calculation means 26. If the determination is "YES" in step f14, then the process proceeds to step f15'. Conversely, if the determination is "NO" (e.g., the angles are not within the predetermined range of values in step f14), the process proceeds to step f16 where the graphic is judged not to be shaped.

In step f15', the reference-for-shaping direction means 32 specifies standard features for shaping. The symmetrizing means 27 corrects the coordinates of the vertexes according to the contents of the reference-for-shaping direction means 32 so that all the valid symmetry axes are made axisymmetrical. For example, the symmetrizing means 27 corrects the coordinates by a well-known manner using mathematics such as by calculating the coordinates of a point A, which is symmetric with a point B to the axis.

FIGS. 15A–17B illustrate identification of valid symmetry axes and results of shaping according to the present invention.

Figure 15A:
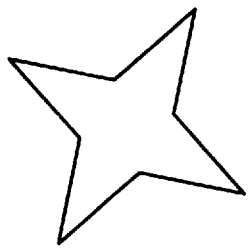
FIG. 15A illustrates an inputted graphic.
Figure 15B:
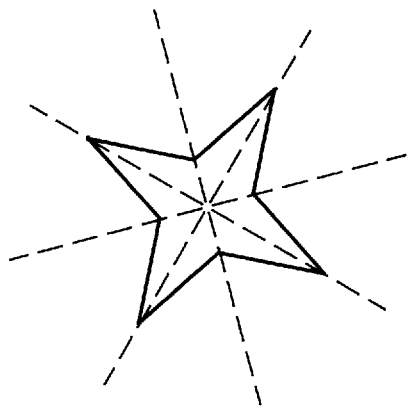
FIG. 15B illustrates the graphic of FIG. 15A after shaping according to the present invention.

Specifically, FIG. 15A illustrates a four-pointed star which has four valid symmetry axes. The symmetry axes are adjusted to be positioned at equal angles from one another, as shown in FIG. 15B, to correct the shape of the figure.

Figure 16A:
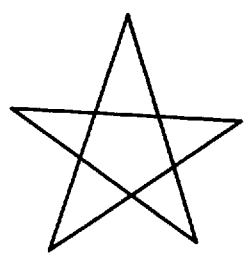
FIG. 16A illustrates another graphic.
Figure 16B:
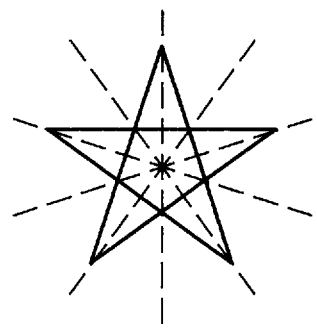
FIG. 16B illustrates the graphic of FIG. 16A after shaping according to the present invention.

FIG. 16A illustrates a five-pointed star which has five valid symmetry axes. The symmetry axes are adjusted to be positioned at equal angles from one another, as shown in FIG. 16B, to correct the shape of the figure.

Figure 17A:
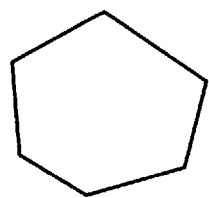
FIG. 17A illustrates yet another graphic.
Figure 17B:
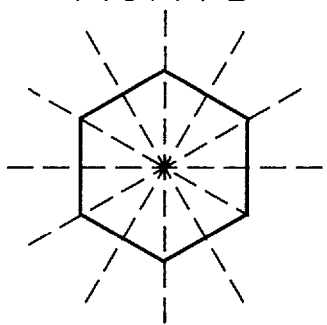
FIG. 17B illustrates the graphic of FIG. 17A after shaping according to the present invention.
Figure 18:
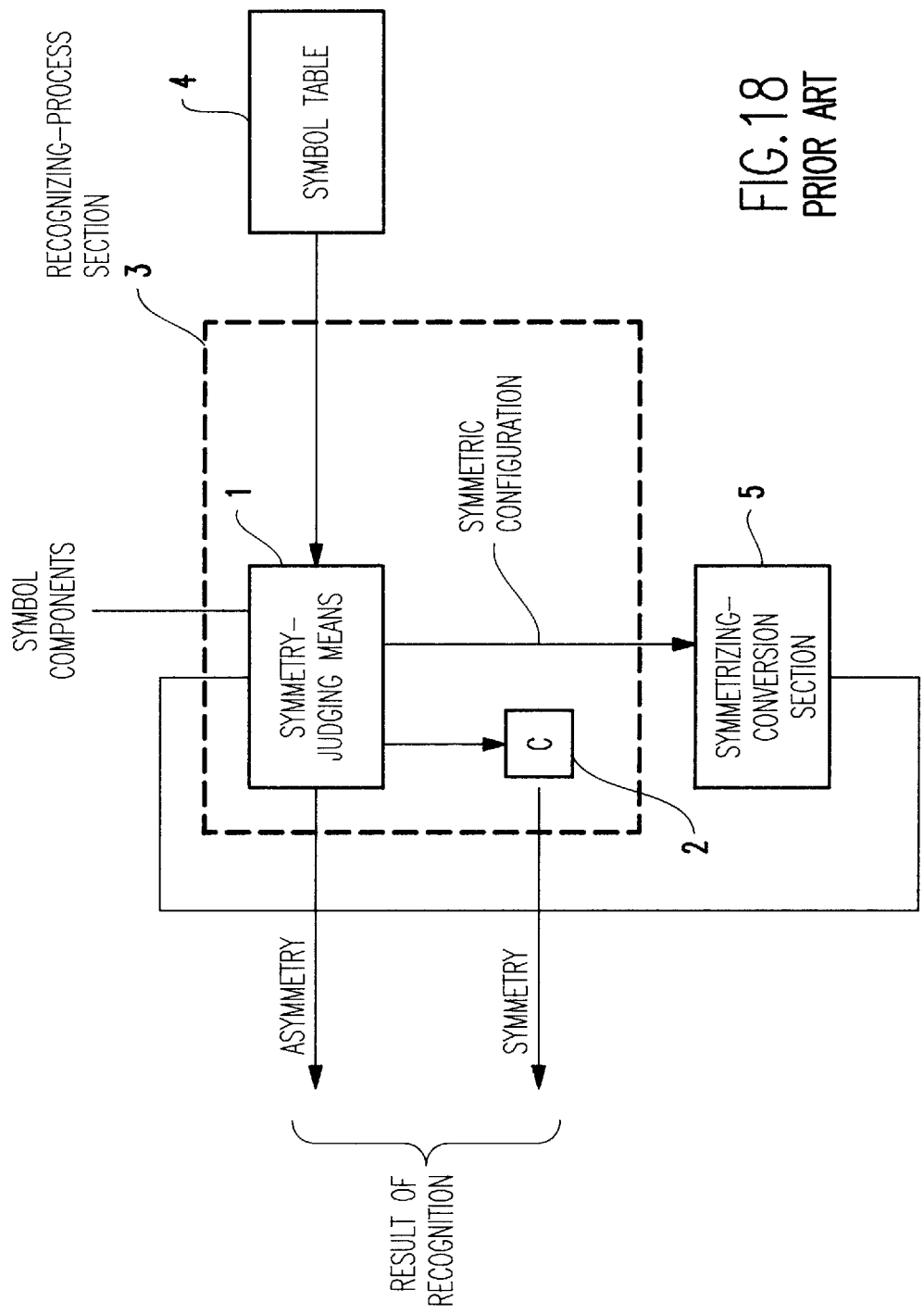
FIG. 18 is a block diagram illustrating a conventional graphic-shaping apparatus.
Figure 19:
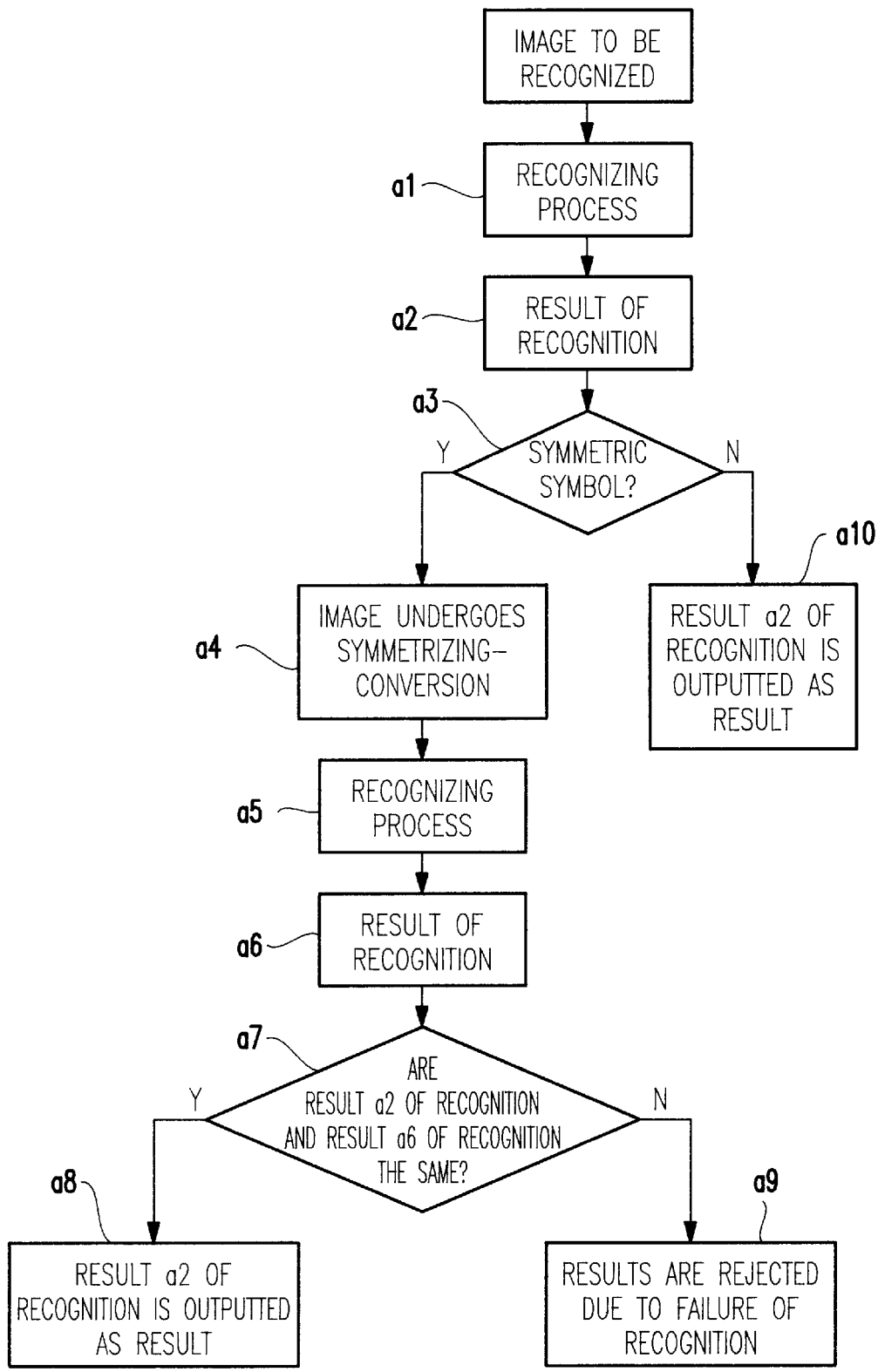
FIG. 19 is a flow chart illustrating an operation of the conventional graphic-shaping apparatus shown in FIG. 18.
Figure 20:
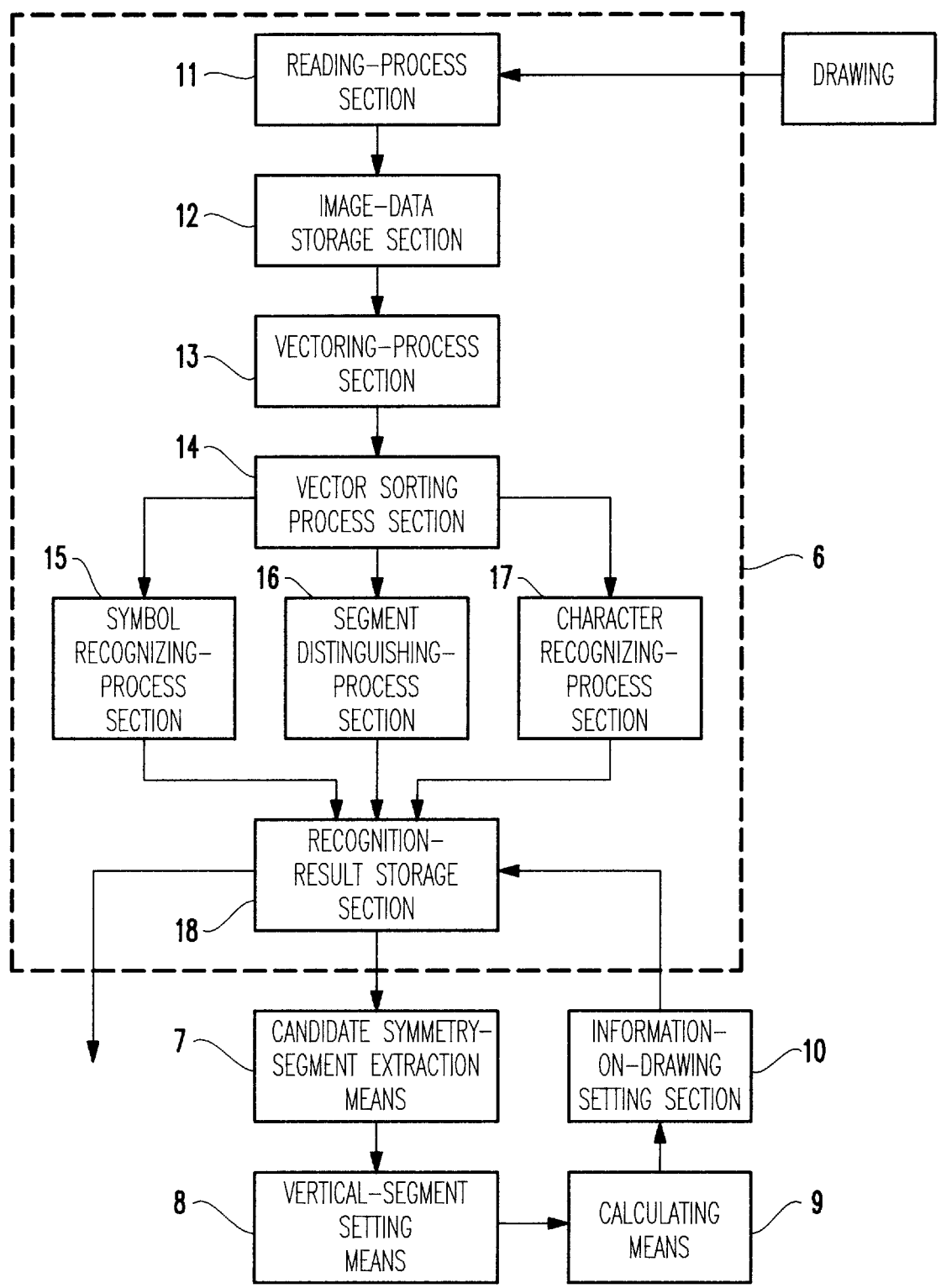
FIG. 20 is a block diagram illustrating a second conventional graphic-shaping apparatus.
Figure 21:
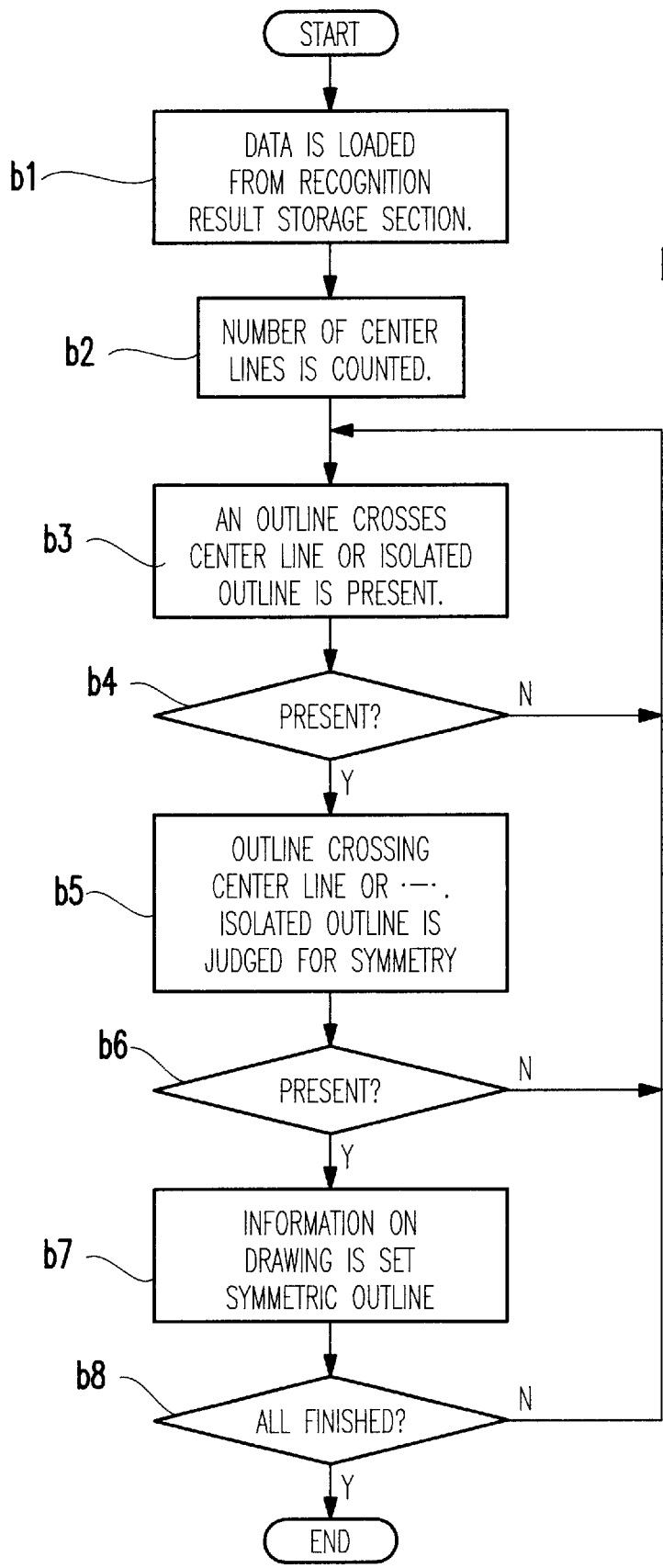
FIG. 21 is a flow chart illustrating an operation of the second conventional graphic-shaping apparatus shown in FIG. 20.
Figure 22:
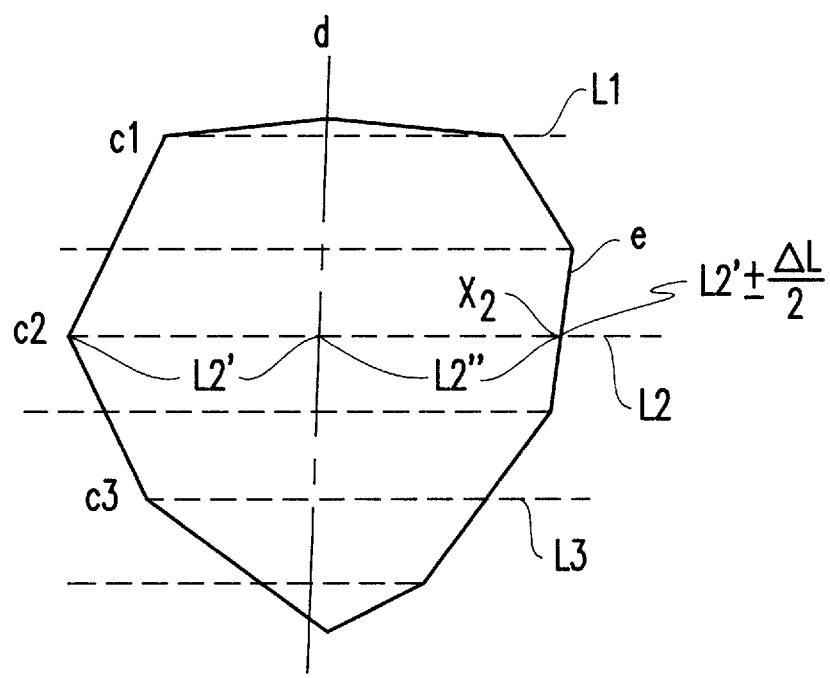
FIG. 22 illustrates the principle of axisymmetrical shaping.

FIG. 17A illustrates a six-sided figure which has six valid symmetry axes. The symmetry axes are adjusted to be positioned at equal angles from one another, as shown in FIG. 17B, to correct the shape of the figure and provide a symmetrical hexagonal shape.

It is noted that FIGS. 15A–17B are only intended as examples and not limiting to the type of shapes or graphics which the present invention may shape. These exemplary shapes were made by regular polygons formed by connecting the outer vertexes (e.g., a polygon from the four-point star of FIG. 15B, a pentagon formed by the five-pointed star of FIG. 16B, etc.).

Advantages of the Present Invention

With the graphic-shaping apparatus and method according to the present invention described herein, graphics may be evaluated for axisymmetry regardless of their configurations, and the graphics may be shaped based on the evaluation results. Additionally, in each of the embodiments the user need not designate and input a symmetry axis beforehand, as in the conventional apparatuses.

Further, with the apparatus incorporating the second embodiment of the data-processing unit, the candidate symmetry axes which cannot provide symmetry may be discarded (dismissed) earlier in the process, which increases the processing speed.

Also, with the apparatus having the data processing-unit of the third embodiment, the gradients of all the valid symmetry axes are corrected so that the nearly horizontal or vertical candidate symmetry axes are made horizontal or vertical. This enhances the shaping of the graphic because it is relatively easy to acquire more visible, axisymmetrical graphics with horizontal/vertical symmetry axes.

With the fourth embodiment of the data-processing unit, the graphics are evaluated for symmetry by using three or more valid symmetry axes. This increases the processing speed as compared to the first embodiment.

With the graphic-shaping apparatus of the second embodiment, standard features may be specified for making the graphics symmetric. This allows the shape of the graphics to be formed to coincide more closely with shapes which are intended to be formed or recognized by the user.

Additionally, the above embodiments of the present invention may be stored as a program or process on a computer-readable media, such as a magnetic media (e.g., hard disk or floppy diskette) or an optical media (e.g., CD-ROM), for implementation with, and executable by, a general-purpose computer.

While the invention has been described with reference to the specific embodiments described above, it is not limited thereto and includes all variations which would be known to those ordinarily skilled in the art.

Having thus described my invention, what I claim as new and desire to secure by Letters Patent is as follows:

1. A graphic-shaping apparatus for determining symmetry of a graphic, comprising:
   means for measuring positions of lines of said graphic, positions of mid-points of said lines, and positions of vertexes of said graphic, said vertexes being located at ends of said lines;
   means for determining a plurality of candidate symmetry axes for said graphic passing through said mid-points or said vertexes input from said measuring means;
   means for judging whether the plurality of candidate symmetry axes comprise a predetermined number of valid symmetry axes; and
   means for shaping said graphic so that said graphic becomes axissymmetrical with respect to all the valid symmetry axes.

2. A graphic-shaping apparatus for determining symmetry of a graphic, comprising:
   means for forming symmetry axes through a graphic, said graphic including vertexes, said vertexes comprising ends of at least one graphic line of said graphic;
   means, connected to said symmetry axes forming means, for selecting a symmetry axis of said symmetry axes, to produce a selected symmetry axis;
   means, connected to said selecting means, for forming line segments between pairs of opposing vertexes of said vertexes, between pairs of opposing mid-points of said at least one graphic line, and between pairs of opposing vertexes and mid-points of said at least one graphic line;
   measuring means, connected to said line-segments-forming means, for measuring distances between mid-points of said line segments and points where said line segments cross said selected symmetry axis, and for determining angles between said selected symmetry axis and said line segments;
   first determining means, connected to said measuring means, for determining whether said selected symmetry axis comprises a valid symmetry axis;
   counting means, connected to said first determining means, for counting a number of valid symmetry axes and for measuring inter-axial angles between adjacent valid symmetry axes when said number of valid symmetry axes is greater than a predetermined number; and
   second determining means, connected to said counting means, for determining whether said graphic comprises a symmetrical characteristic by determining whether said inter-axial angles are within a predetermined range of angles,
   wherein said second determining means modifies a feature of said graphic when said graphic has said symmetrical characteristic.

3. A graphic-shaping apparatus as in claim 2, further comprising:
   third determining means for determining at least one feature of said graphic inputted to said apparatus, said feature including coordinates of said vertexes of said graphic.

4. A graphic-shaping apparatus as in claim 3, further comprising:
   means, connected to said second determining means, for specifying standard features,
   wherein said second determining means modifies said at least one feature of said graphic based on said standard features.

5. A graphic-shaping apparatus as in claim 2, wherein a first vertex of each of said pairs of opposing vertexes is positioned on a first side of said selected symmetry axis, and a second vertex of each of said pairs of opposing vertexes is positioned on a second side of said selected symmetry axis such that a first line segment of said line segments formed between said first vertex and said second vertex crosses said selected symmetry axis.

6. A graphic-shaping apparatus as in claim 2, wherein said measuring means calculates angular differences between said angles and 90 degrees.

7. A graphic-shaping apparatus as in claim 6, further comprising:
   valid-line-segment-determining means, connected to said measuring means, for determining whether each of said line segments comprises a valid line segment based on whether a distance between a midpoint of said line segment and a point where each of said line segments crosses said selected symmetry axis is less than a predetermined distance; and
   means for determining whether an angular difference between each of said line segments and lines perpendicular to said selected symmetry axis exceeds a predetermined value, and
   wherein said means for determining a valid symmetry axis evaluates said selected symmetry axis based on whether each of said line segments comprises a valid line segment.

8. A graphic-shaping apparatus as in claim 2, further comprising:
   symmetry-axes-correcting means, operatively connected to said second determining means, for determining whether said valid symmetry axes include one of a substantially horizontal symmetry axis and substantially vertical symmetry axis, and for modifying gradients of said valid symmetry axes when said valid symmetry axes include said one of a substantially horizontal symmetry axis and vertical symmetry axis, such that said one of said substantially horizontal symmetry axis and said substantially vertical symmetry axis is modified to become one of a horizontal symmetry axis and a vertical symmetry axis.

9. A graphic-shaping apparatus as in claim 2, further comprising:
   locating means, connected to said second determining means, for locating a third valid symmetry axis,
   wherein said predetermined number of valid axes is two, and wherein said counting means determines that the first and the second valid symmetry axes are present and counts the number of invalid symmetry axes located between said first and second valid symmetry axes, and said locating means determines which of the remaining candidate symmetry axes is the third valid symmetry axis.

10. A graphic-shaping apparatus as in claim 2, wherein said first determining means determines whether said selected symmetry axis comprises a valid symmetry axis based on whether each of said distances exceeds a predetermined distance and each of said angles exceeds a predetermined value.

11. A graphic-shaping apparatus as in claim 2, wherein said first determining means determines whether said selected symmetry axis comprises a valid symmetry axis based on whether an average of said distances exceeds a predetermined distance and an average of an amount by which said angles deviate from 90 degrees exceeds a predetermined value.

12. A method for determining symmetry of a graphic, said method comprising steps of:
forming a plurality of symmetry axes through a graphic, said graphic including vertexes, said vertexes comprising ends of at least one graphic line of said graphic;
selecting a symmetry axis of said symmetry axes, to produce a selected symmetry axis;
forming line segments between pairs of opposing vertexes of said vertexes, between pairs of mid-points of said at least one graphic line, and between pairs of opposing vertexes and mid-points of said at least one graphic line;
measuring distances between mid-points of said line segments and points where said line segments cross said selected symmetry axis, and measuring angles between said selected symmetry axis and said line segments;
determining whether said selected symmetry axis comprises a valid symmetry axis based on said distances and said angles;
counting a number of valid symmetry axes;
measuring inter-axial angles between adjacent valid symmetry axes of said valid symmetry axes when said number of valid symmetry axes is greater than a predetermined number;
determining whether said graphic comprises a symmetrical characteristic by determining whether said inter-axial angles are within a predetermined range of angles; and
modifying said feature of said graphic to form a symmetric graphic when said graphic has said symmetrical characteristic.

13. A method as in claim 12, further comprising steps of:
determining a feature of said graphic, said feature including coordinates of said vertexes of said graphic,
wherein said predetermined number is two.

14. A method as in claim 13, further comprising steps of:
locating a first vertex of each of said pairs of opposing vertexes on a first side of said selected symmetry axis; and
locating a second vertex of each of said pairs of opposing vertexes on a second side of said selected symmetry axis, such that a line segment of said line segments formed between said first vertex and said second vertex crosses said selected symmetry axis.

15. A method as in claim 13, further comprising steps of:
specifying at least one standard feature; and
modifying said feature of said graphic based on said standard feature.

16. A method as in claim 12, further comprising a step of calculating angular differences between said angles and 90 degrees.

17. A method as in claim 12, further comprising steps of:
determining whether each of said line segments comprises a valid line segment based on whether a distance between midpoints of each of said line segments and points where said line segments cross said selected symmetry axis is less than said predetermined distance and whether angular differences between each of said line segments and lines perpendicular to said selected symmetry axis exceed a predetermined value; and
evaluating said selected symmetry axis based on whether each of said line segments comprises a valid line segment.

18. A method as in claim 12, further comprising steps of:
determining whether said valid symmetry axes include one of a substantially horizontal symmetry axis and a substantially vertical symmetry axis; and
modifying gradients of said valid symmetry axes when said valid symmetry axes include said one of said substantially horizontal symmetry axis and said substantially vertical symmetry axis, such that said one of said substantially horizontal symmetry axis and said substantially vertical symmetry axis is modified to become one of a horizontal symmetry axis and a vertical symmetry axis.

19. A method as in claim 12, wherein said predetermined number is two, said method further comprising steps of:
counting, when the first and the second valid symmetry axes are judged to be present, the number of invalid symmetry axes located between said first and second valid symmetry axes; and
determining which of the remaining candidate symmetry axes is the third valid symmetry axis.

20. A method as in claim 12, further comprising a step of:
determining whether said selected symmetry axis comprises a valid symmetry axis based on whether each of said distances exceeds a predetermined distance and each of said angles exceeds a predetermined value.

21. A method as in claim 12, further comprising a step of:
determining whether said selected symmetry axis comprises a valid symmetry axis based on whether an average of said distances exceeds a predetermined distance and an average of an amount by which said angles deviate from 90 degrees exceeds a predetermined value.

22. A method for determining symmetry of a graphic, said method comprising steps of:
determining positions of lines of said graphic, positions of mid-points of said lines, and positions of vertexes of said graphic, said vertexes being located at ends of said lines;
forming at least one symmetry axis lying between two opposing vertexes, between two opposing mid-points, and between one vertex and one mid-point opposing each other and approximately dividing said graphic in substantially two equal halves;
selecting a symmetry axis of said at least one symmetry axis, to produce a selected symmetry axis;
forming at least one perpendicular line between one of opposing pairs of said mid-points, opposing pairs of said vertexes, and opposing pairs of said mid-points and said vertexes which crosses said selected symmetry axis, such that said at least one perpendicular line is substantially perpendicular to said selected symmetry axis;

measuring at least one distance from a center of said at least one perpendicular line and a point where said selected symmetry axis respectively crosses said at least one perpendicular line;

measuring at least one angle between said at least one perpendicular line and said selected symmetry axis; and determining whether said selected symmetry axis comprises a valid symmetry axis based on whether said distance and said angle are within predetermined values.

23. A method as in claim 22, further comprising a step of:

sequentially selecting any remaining symmetry axes of said at least one symmetry axis and determining whether each of said remaining symmetry axes are valid symmetry axes.

24. A method as in claim 23, further comprising steps of:

determining a number of said valid symmetry axes;

measuring angles between adjacent valid symmetry axes of said valid symmetry axes; and determining whether said graphic comprises a symmetric graphic based on whether said angles between adjacent symmetry axes are within a predetermined range of angles.

25. A program storage device readable by machine, tangibly embodying a program of instructions executable by the machine to perform method steps for symmetrizing a graphic, said method steps comprising:

measuring positions of lines of said graphic, positions of mid-points of said lines, and positions of vertexes of said graphic, said vertexes being located at ends of said lines;

determining a plurality of candidate symmetry axes for said graphic passing through said mid-points or said vertexes measured in said measuring step;

judging whether the plurality of candidate symmetry axes comprise a predetermined number of valid symmetry axes; and shaping said graphic so that said graphic becomes axis-symmetrical with respect to all the valid symmetry axes.

26. A computer-readable media for storing a program including method steps for controlling said computer, said method steps comprising:

measuring positions of lines of said graphic, positions of mid-points of said lines, and positions of vertexes of said graphic, said vertexes being located at ends of said lines;

determining a plurality of candidate symmetry axes for said graphic passing through said mid-points or said vertexes measured in said measuring step;

judging whether the plurality of candidate symmetry axes comprise a predetermined number of valid symmetry axes; and shaping said graphic so that said graphic becomes axis-symmetrical with respect to all the valid symmetry axes.

* * * * *